Dec. 15, 1959     C. A. NERACHER ET AL     2,916,939
POWER TRANSMISSION
Original Filed May 9, 1939     14 Sheets-Sheet 1
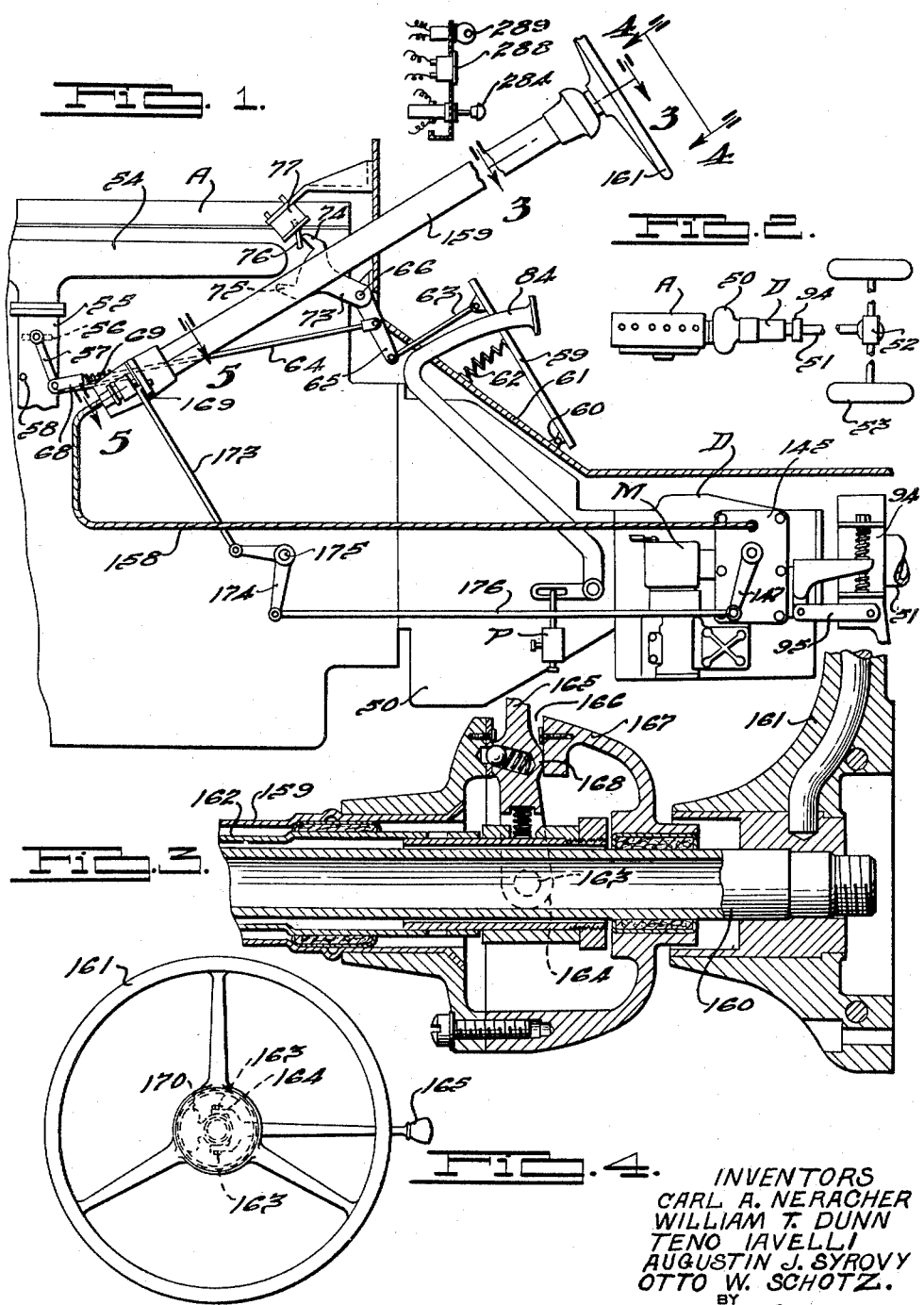
INVENTORS
CARL A. NERACHER
WILLIAM T. DUNN
TENO IAVELLI
AUGUSTIN J. SYROVY
OTTO W. SCHOTZ.
BY
ATTORNEYS.

Dec. 15, 1959     C. A. NERACHER ET AL     2,916,939
POWER TRANSMISSION
Original Filed May 9, 1939     14 Sheets-Sheet 2
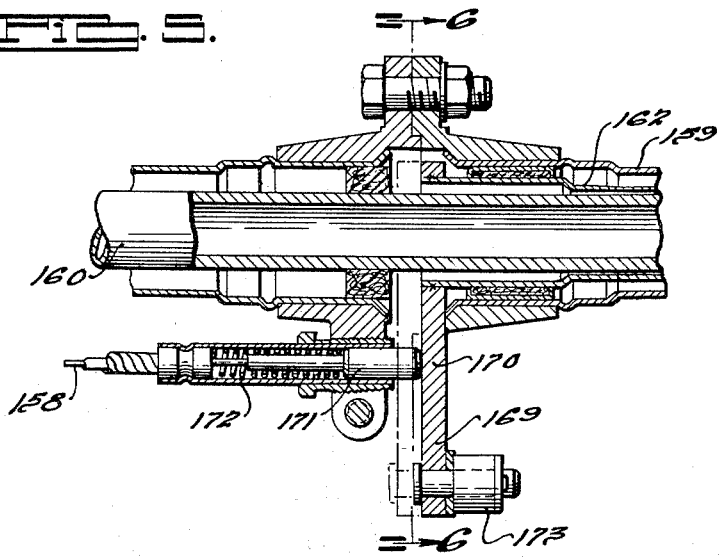
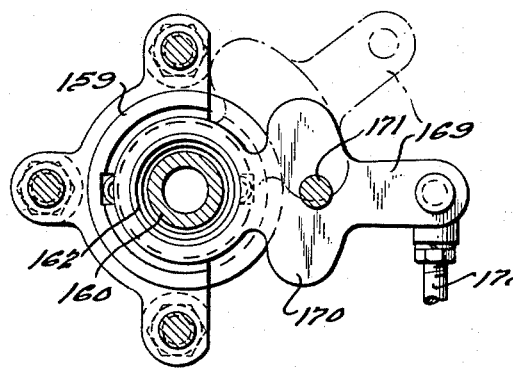
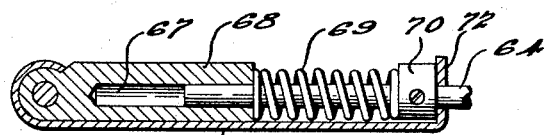
INVENTORS
CARL A. NERACHER
WILLIAM T. DUNN
TENO IAVELLI
AUGUSTIN J. SYROVY
OTTO W. SCHOTZ
BY
ATTORNEYS.

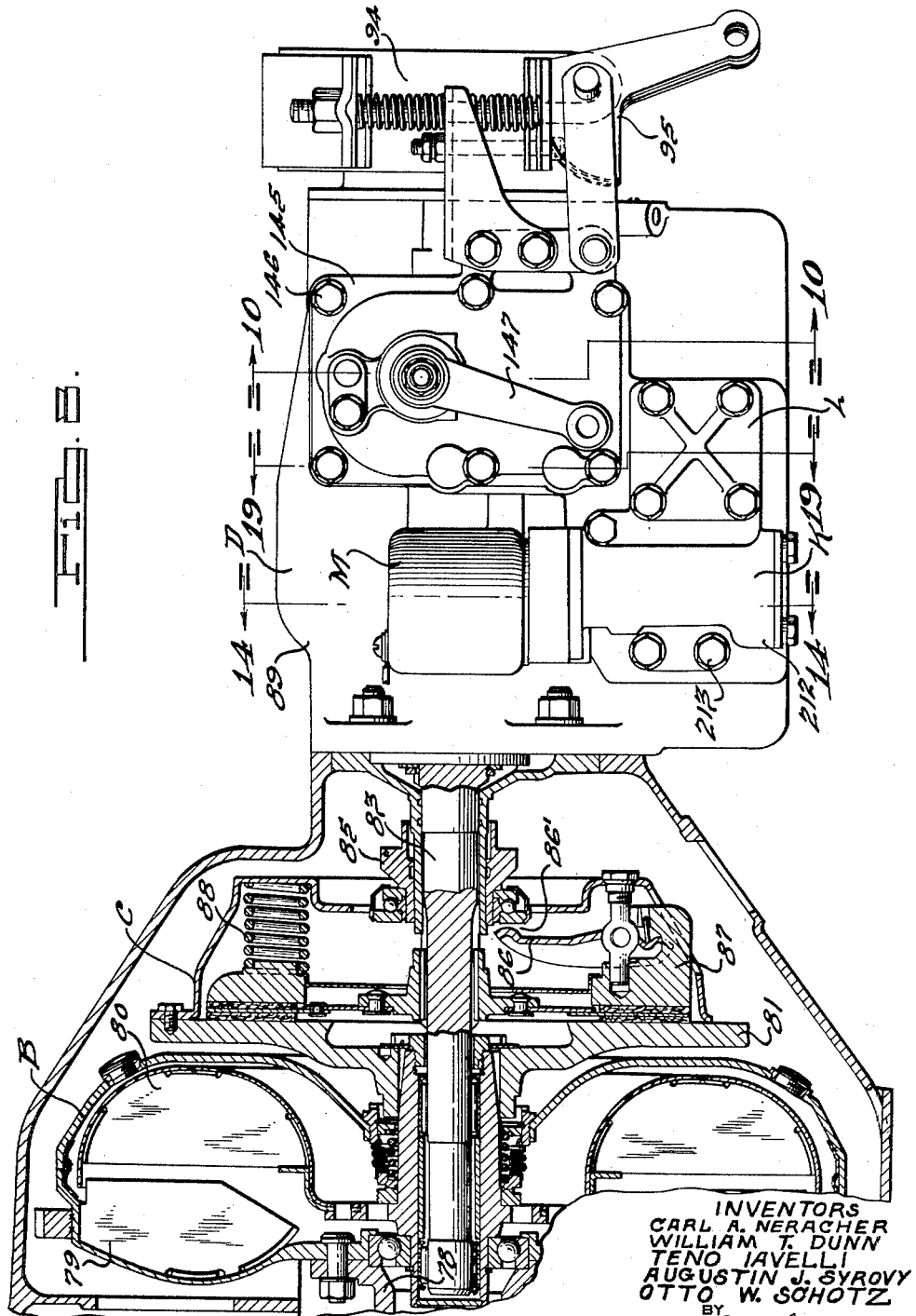

Dec. 15, 1959 C. A. NERACHER ET AL 2,916,939
POWER TRANSMISSION
Original Filed May 9, 1939 14 Sheets-Sheet 4
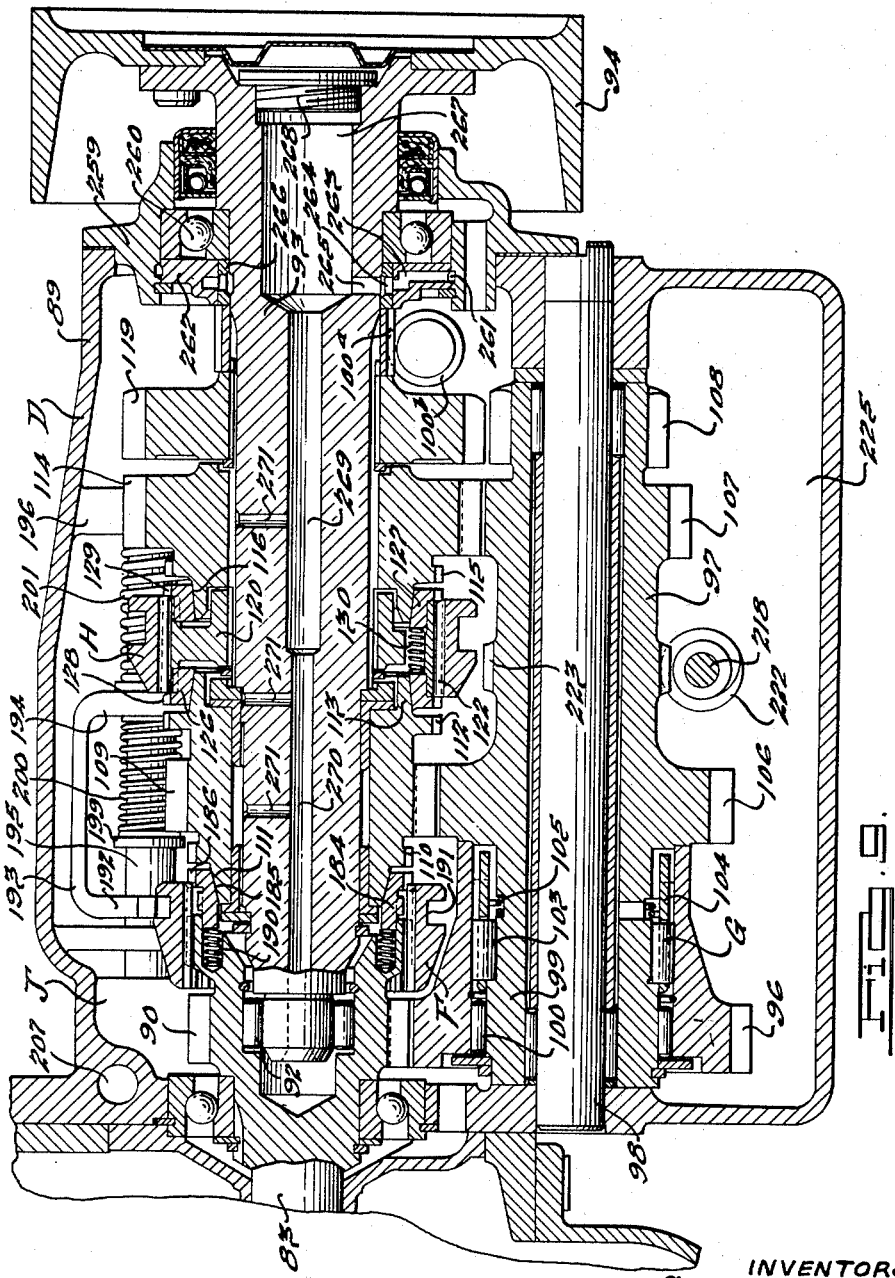
INVENTORS
CARL A. NERACHER
WILLIAM T. DUNN
TENO IAVELLI
AUGUSTIN J. SYROVY
OTTO W. SCHOTZ.
BY
ATTORNEYS

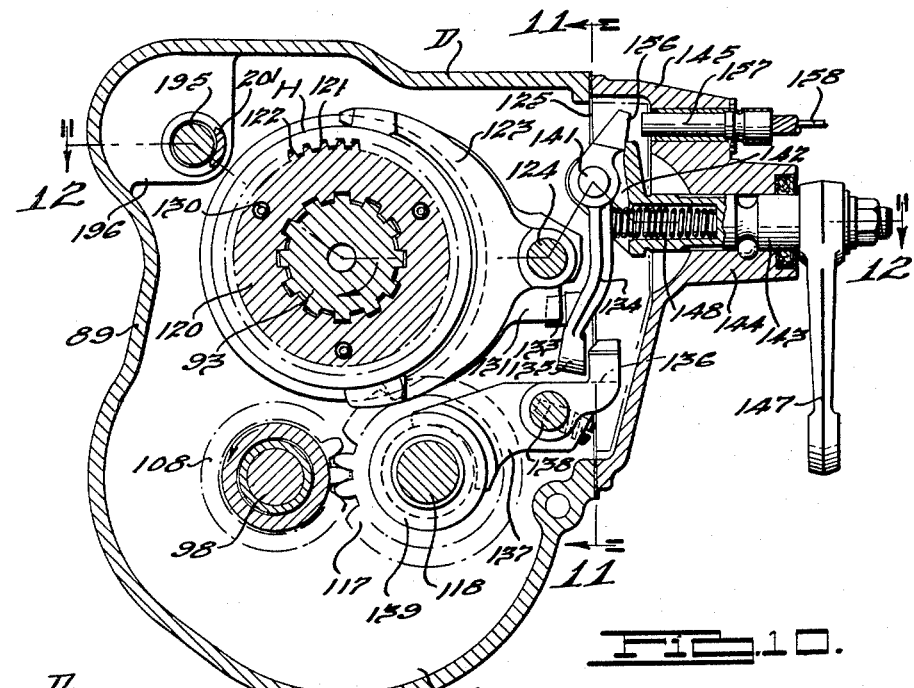

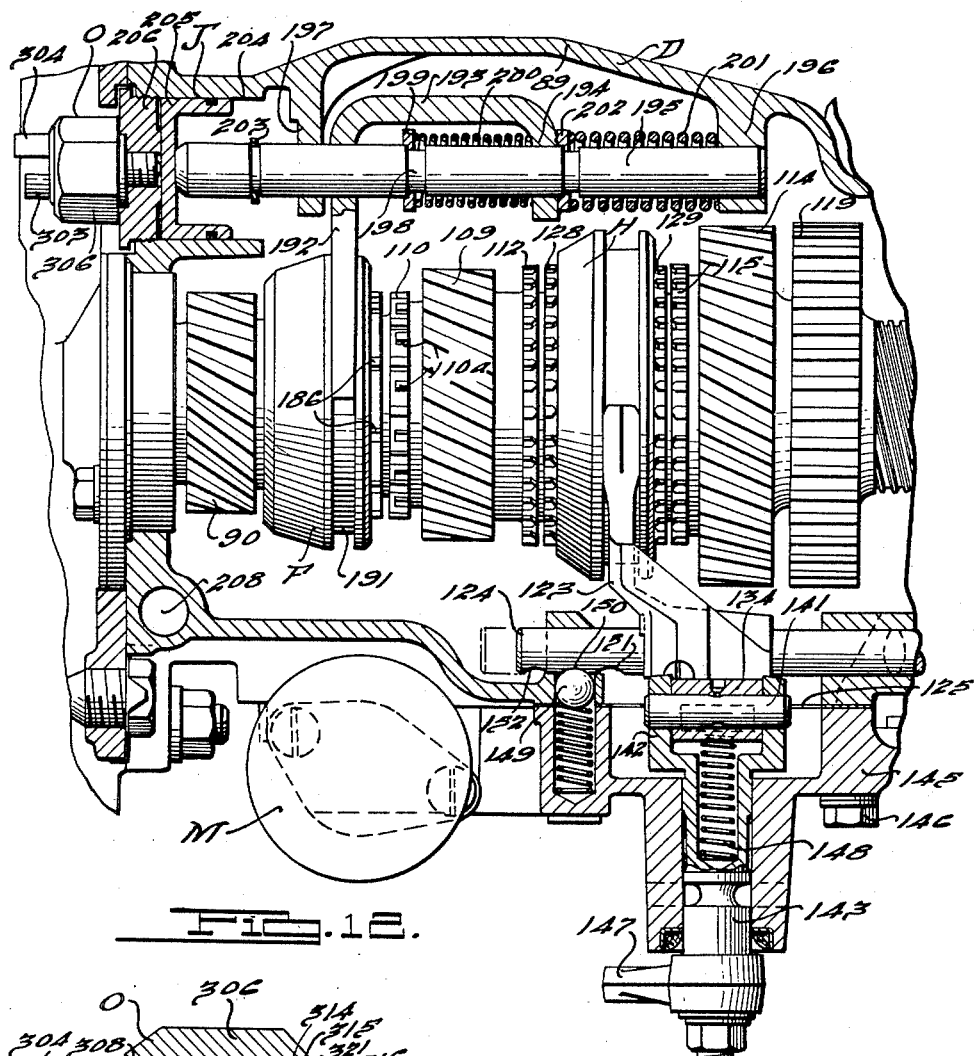

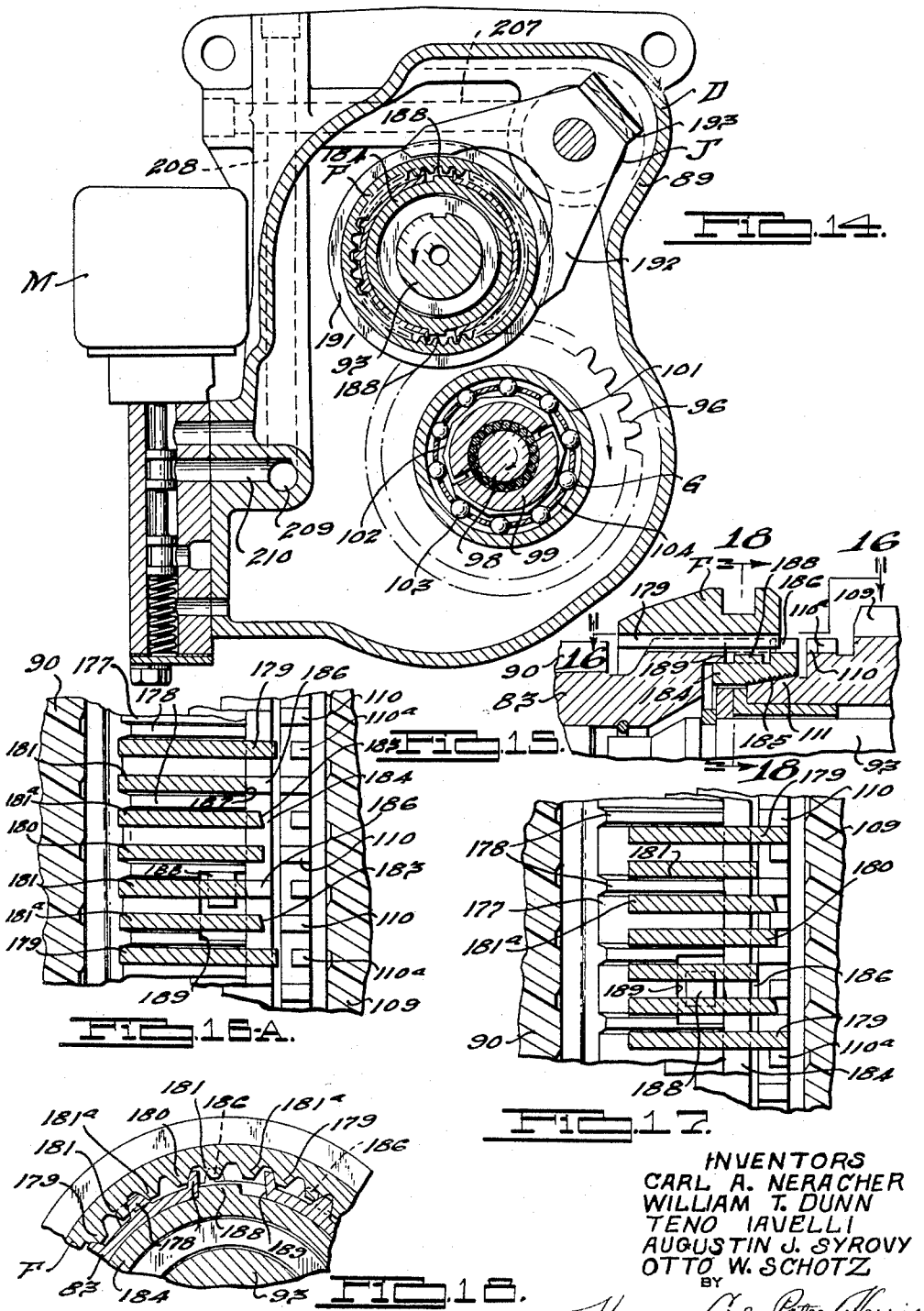

INVENTORS
CARL A. NERACHER
WILLIAM T. DUNN
TENO IAVELLI
AUGUSTIN J. SYROVY
OTTO W. SCHOTZ
ATTORNEYS.

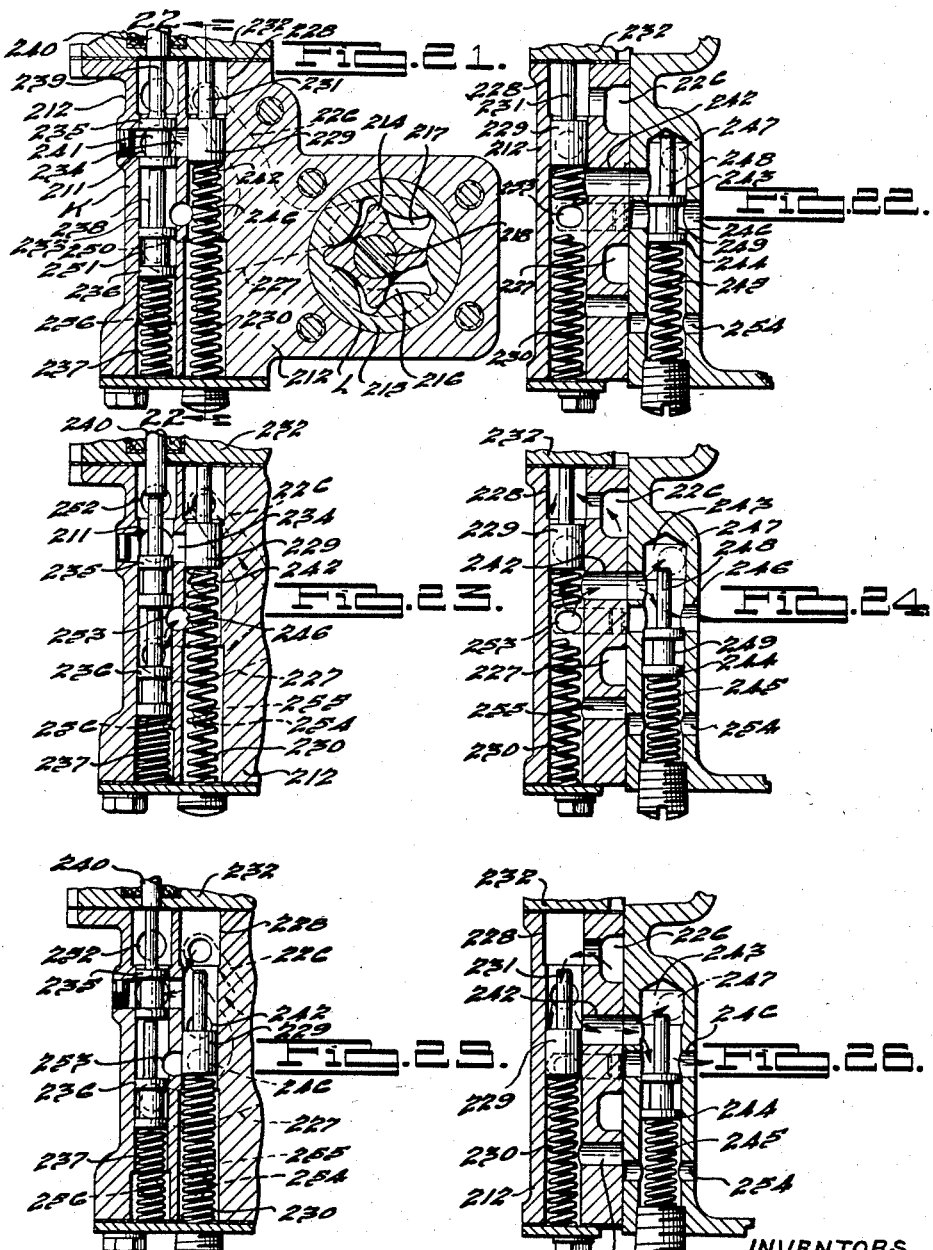

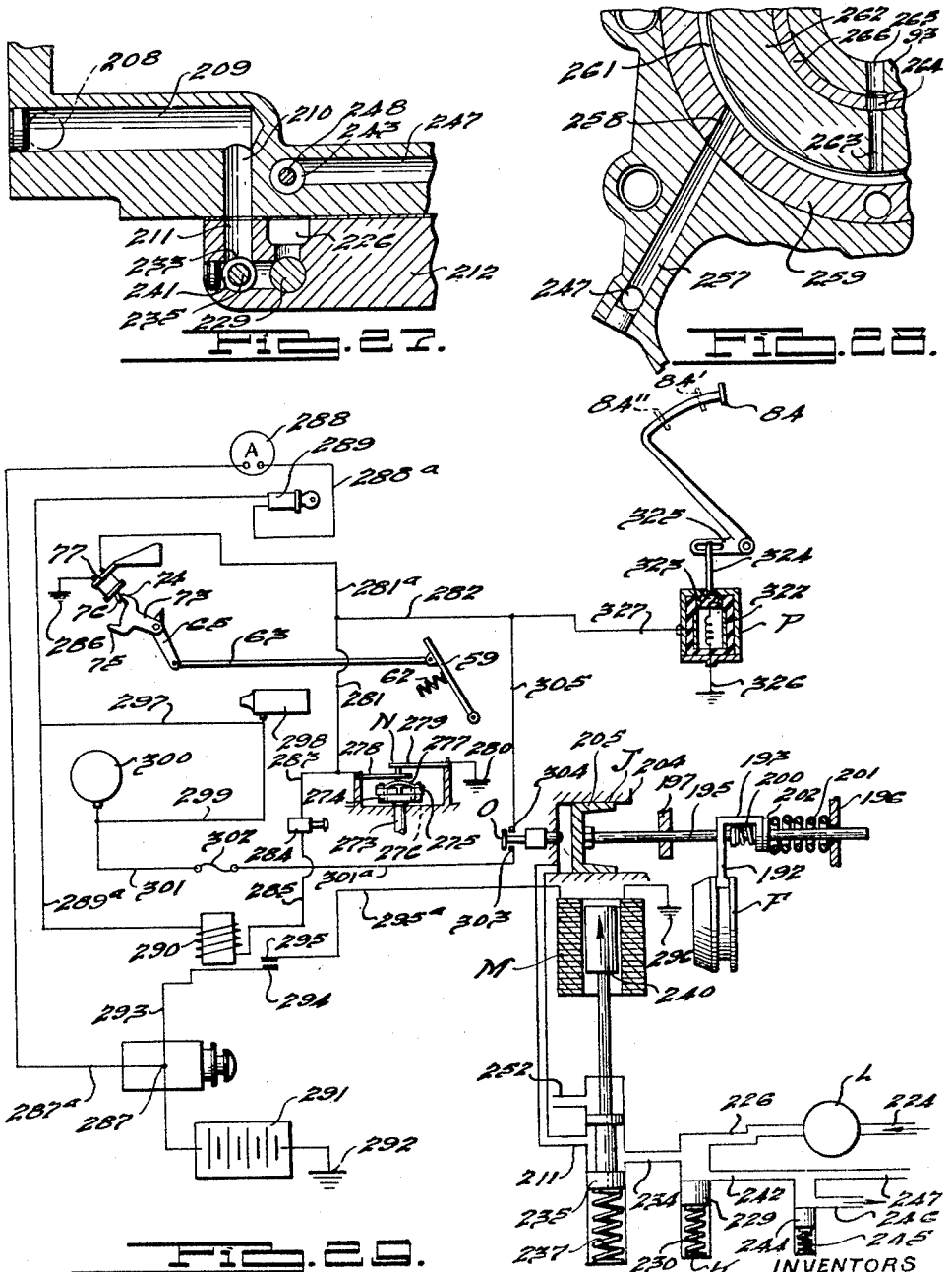

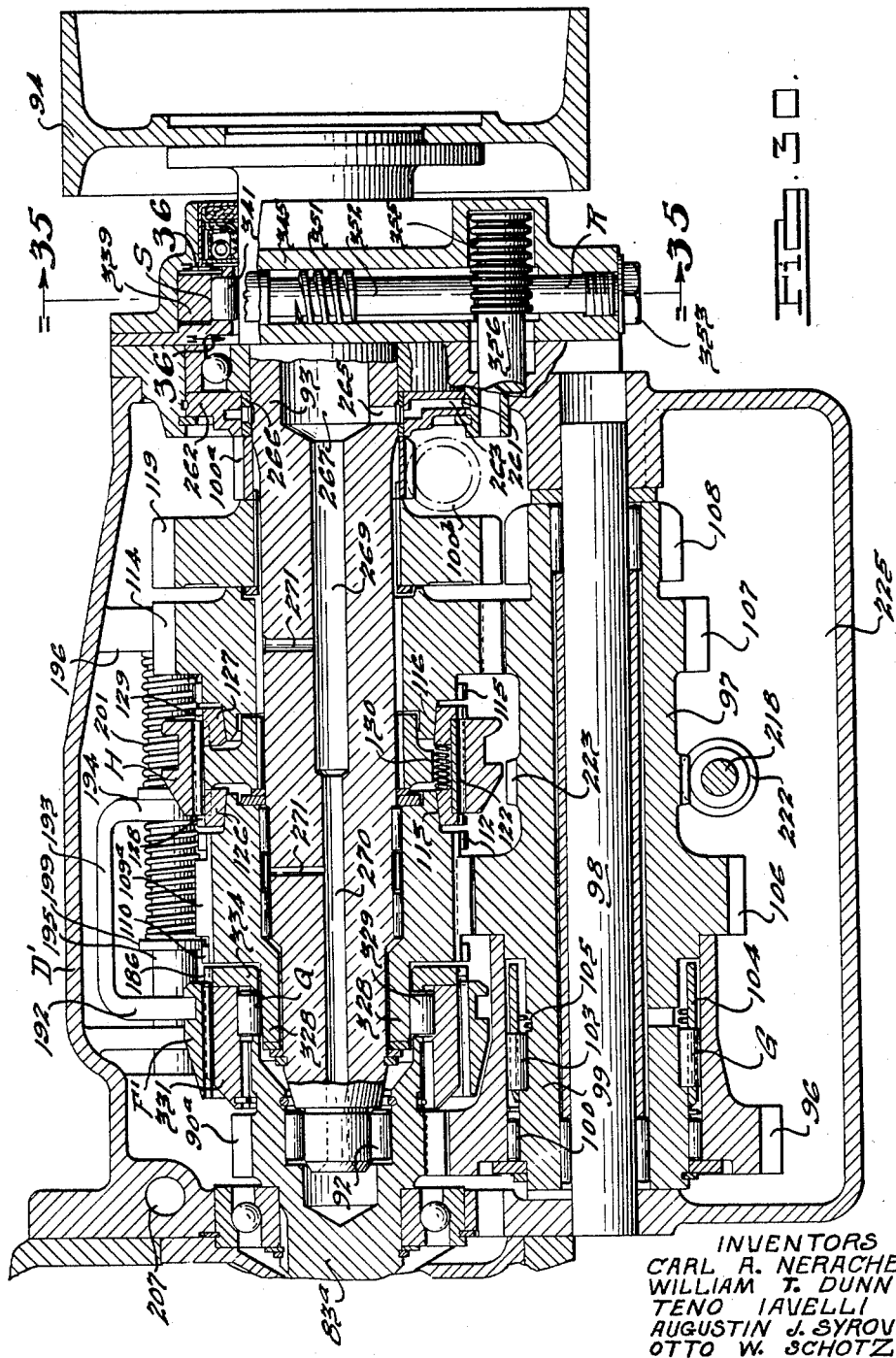

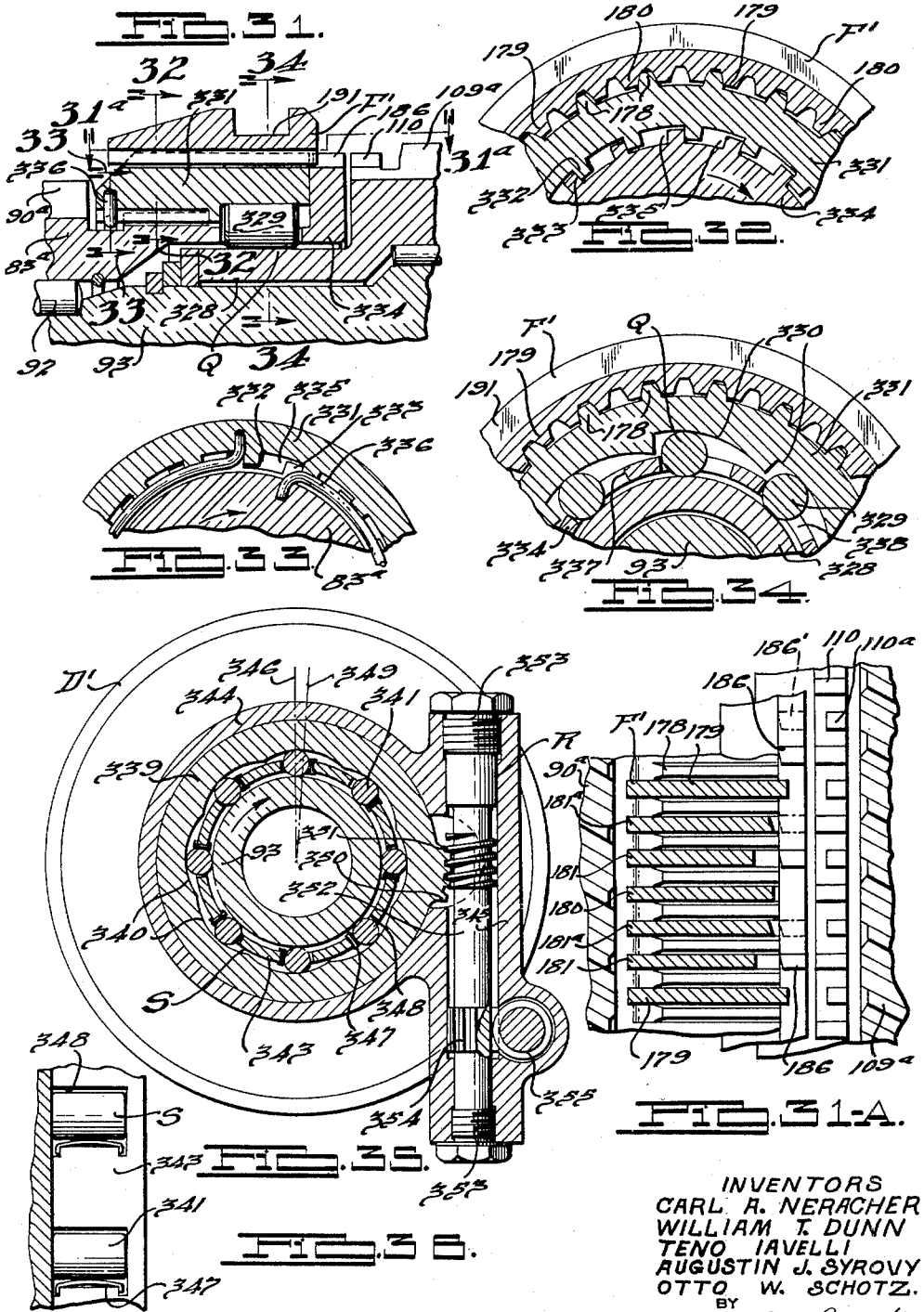

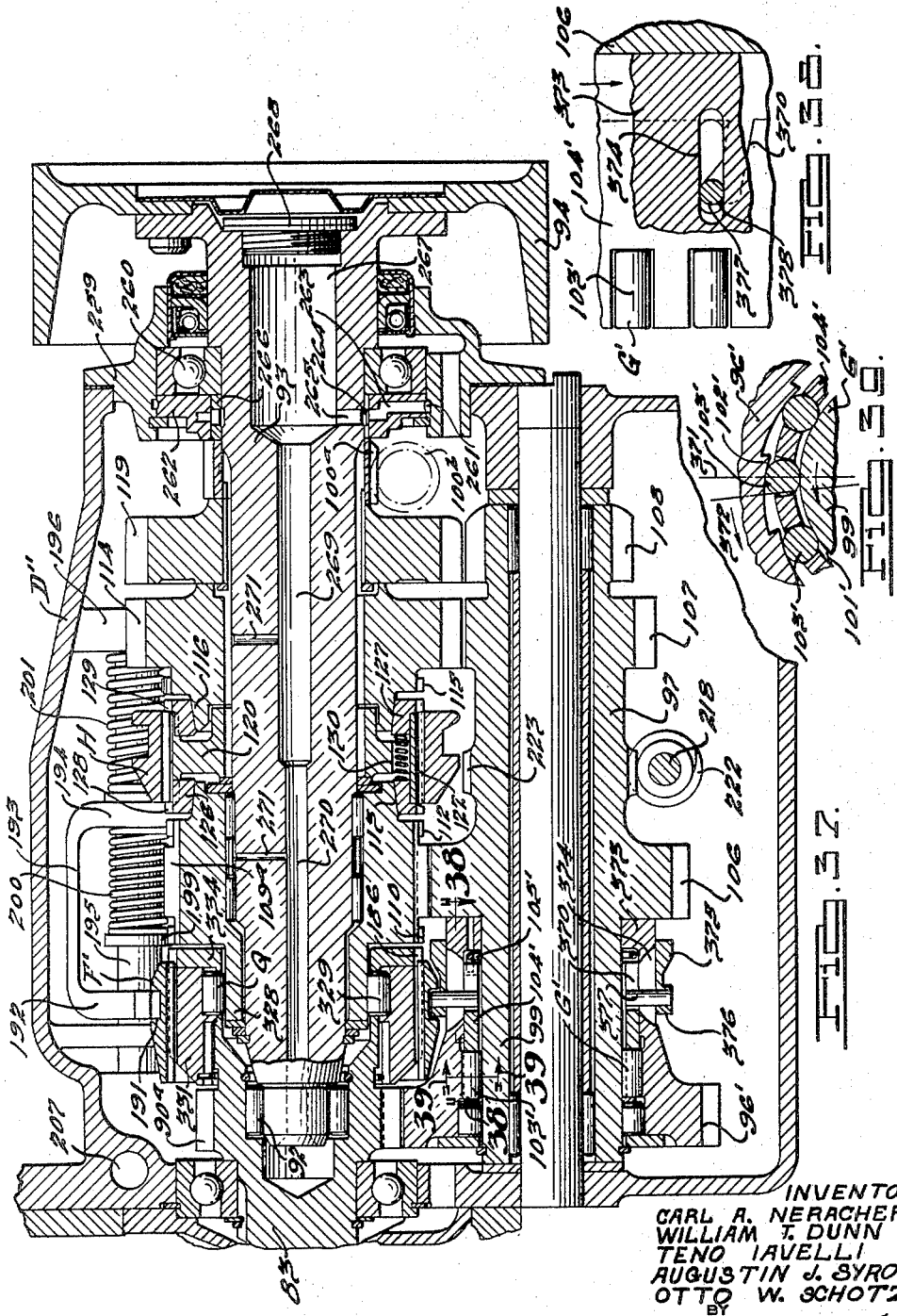

Dec. 15, 1959    C. A. NERACHER ET AL    2,916,939
POWER TRANSMISSION

Original Filed May 9, 1939    14 Sheets-Sheet 14

INVENTORS
CARL A. NERACHER
WILLIAM T. DUNN
TENO IAVELLI
AUGUSTIN J. SYROVY
OTTO W. SCHOTZ.
BY
ATTORNEYS.

United States Patent Office 2,916,939
Patented Dec. 15, 1959

2,916,939

POWER TRANSMISSION

Carl A. Neracher, William T. Dunn, Teno Iavelli, Augustin J. Syrovy, and Otto W. Schotz, Detroit, Mich., assignors to Chrysler Corporation, Highland Park, Mich., a corporation of Delaware Original application May 9, 1939, Serial No. 272,734. Divided and this application June 17, 1941, Serial No. 398,450

25 Claims. (Cl. 74—472)

This invention relates to power transmissions and refers more particularly to improved driving systems for motor vehicles.

This application is a division of our copending application Serial No. 272,734, filed May 9, 1939.

It is an object of our invention to provide a transmission system affording improved characteristics of change speed control with a comparatively simple mechanism capable of long life.

Another object of our invention is to provide a transmission affording improved means for changing speed ratios through the medium of positively engaging clutch means having synchronous control for ensuring clutching without shock or ratcheting noise.

A further object is to provide an improved system of vehicle drive incorporating both manual and automatic change speed control affording improved vehicle driving functions.

We have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of troque multiplication and other power transmitting characteristics. Our driving mechanism affords improved quietness and smoothness of car operation and facilitates manipulation of the car especially under close traffic conditions.

We preferably employ a relatively fast axle such when the transmission is in direct the overall drive is the practical equivalent of an overdrive without driving through gear trains at such time. This is practically obtainable without sacrificing car performance by our improved synchronous clutching means which automatically responds to manipulations of the accelerator pedal for stepping the speed ratio up or down.

With our transmission it is practicable for the driver to stay in a selected speed ratio setting while stopping and thereafter obtain rapid car starting accelerations under favorable torque multiplication and faster ratio boulevard or country drive conditions without operating clutch pedal or gear shift lever.

We have provided a manual selection of high and low ranges in our transmission but in most instances the low range is in the nature of an emergency low and when the fluid coupling is employed very desirable car accelerating characteristics are obtained by manual selection of the high range.

According to the present embodiment of our invention, we have provided a transmission employing countershaft gearing and providing four forward speeds and reverse. Manual selection may be made to high and low ranges in each of which an automatic shift occurs to a faster drive ratio and back to the selected range, the automatic shifting being effected by natural functional manipulations of the accelerator pedal.

In one embodiment of our invention we have provided a speed responsive control on the automatic shift means controlling this shift in a novel manner.

Additional features of our invention are found in the provision of a simplified remote shift mechanism for the manual control; an improved no-back control to prevent undesired backward car movement; and many features of construction and functional operation which will be more apparent from the following illustrative embodiments of the principles of our invention, reference being had to the accompanying drawings in which:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is a sectional view along line 5—5 of Fig. 1 showing a portion of the remote control shift.

Fig. 6 is a detail sectional view taken as indicated by line 6—6 of Fig. 5.

Fig. 7 is a detail sectional elevational view of a portion of the engine throttle operating mechanism shown in Fig. 1.

Fig. 8 is an enlarged side view partly in section and partly in elevation showing the Fig. 1 power transmission.

Fig. 9 is a sectional elevational view through the speed ratio changing transmission which is illustrated in elevation in Fig. 8.

Fig. 10 is a transverse sectional view looking rearwardly as indicated by line 10—10 of Fig. 8, showing the transmission portion of the remote shift mechanism.

Fig. 11 is a detail sectional view taken as indicated by line 11—11 of Fig. 10.

Fig. 12 is a sectional plan view taken as indicated by line 12—12 of Fig. 10.

Fig. 13 is a sectional view through the pressure fluid controlled switch.

Fig. 14 is a transverse sectional view through the transmission according to line 14—14 of Fig. 8.

Fig. 15 is a detailed enlarged view of the synchronous blocker clutch or coupling mechanism.

Fig. 16 is a sectional plan view illustrated as a development according to line 16—16 of Fig. 15, the automatic clutching sleeve being released.

Fig. 16A is a similar view showing the automatic clutching sleeve in its intermediate blocked position.

Fig. 17 is a similar view showing the parts in full clutching engagement.

Fig. 18 is a transverse sectional view taken as indicated by line 18—18 of Fig. 15.

Fig. 21 is a sectional view taken on line 21—21 of Fig. 19 illustrating the valving control for the pressure fluid before the engine ignition is turned on.

Fig. 22 is a sectional view of the Fig. 21 valving taken as indicated by line 22—22 of Fig. 21.

Figs. 23 and 24 are views of the valving corresponding to Figs. 21 and 22 respectively but showing the valving positioned during low speed car drive or with the kickdown control in operation.

Figs. 25 and 26 are views of the valving corresponding to Figs. 21 and 22 respectively but showing the valving positioned in the normal driving range of the car.

Fig. 27 is a detail sectional view taken as line 27—27 of Fig. 20 showing the pressure fluid discharge passages from the valving for passage to the pressure fluid motor for operating the automatically shiftable clutch sleeve.

Fig. 28 is a detail sectional view taken as indicated by line 28—28 of Fig. 20 showing the lubricant supply passage system.

Fig. 29 is a diagrammatic view of the transmission control system.

Fig. 30 is a view corresponding to Fig. 9 but illustrating a modified form of transmission.

Fig. 31 is an enlarged sectional view of the synchronous blocker clutch or coupling of the Fig. 30 mechanism.

Fig. 31a is a view corresponding to Fig. 16 but illustrating the Fig. 30 modification, the view being taken as indicated by lines 31a—31a of Fig. 31.

Fig. 32 is a detail transverse sectional view according to line 32—32 of Fig. 31.

Fig. 33 is a further detail sectional showing at line 33—33 of Fig. 31.

Fig. 34 is another sectional view taken along line 34—34 of Fig. 31.

Fig. 35 is a sectional elevational view according to line 35—35 of Fig. 30 showing the no-back control mechanism.

Fig. 36 is a detail sectional view according to line 36—36 of Fig. 30.

Fig. 37 is a fragmentary view of the Fig. 30 transmission modified to incorporate a control between the automatic shift sleeve and the countershaft overrunning clutch.

Fig. 38 is a sectional view along line 38—38 of Fig. 37.

Fig. 39 is a sectional view along line 39—39 of Fig. 37.

Figure 19:
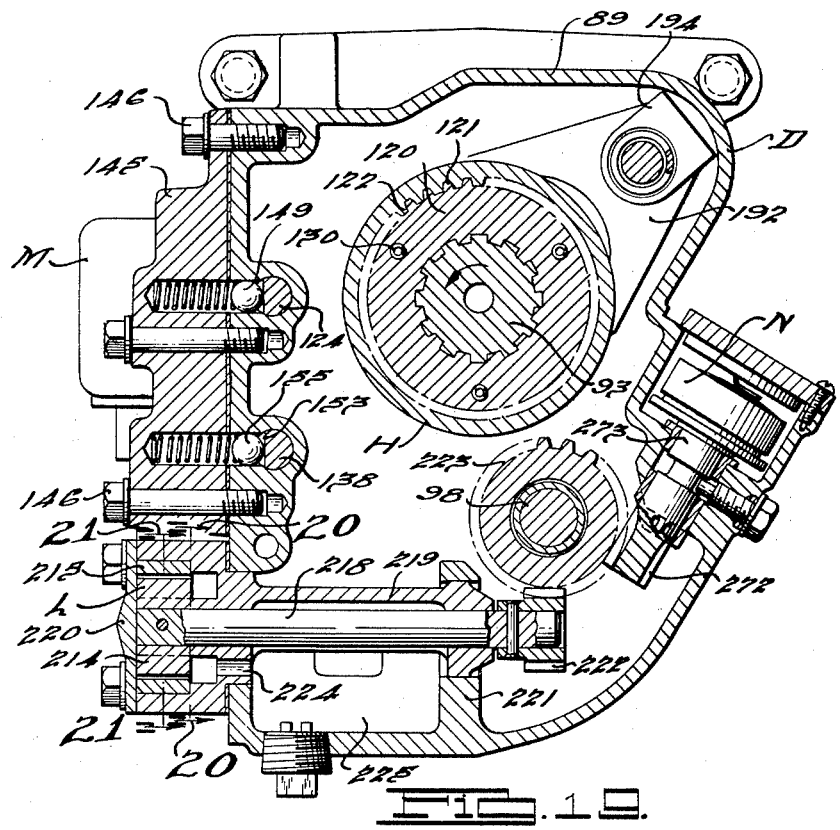
Fig. 19 is a transverse sectional view through the transmission as indicated by line 19—19 of Fig. 8.

We have illustrated the principles of our invention in connection with a motor vehicle drive wherein the usual engine A transmits its drive through clutching means B, C within casing 50, the drive then passing through the change speed transmission D and propeller shaft 51 (Fig. 2) to the differential 52 and thence to the vehicle ground wheels 53 where it is desired to drive the rear wheels according to present day practice.

By preference, the arrangement is such that a "faster" rear axle ratio is afforded than is generally customary so that when the transmission is in direct drive, the car is driven in the equivalent of an overdrive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation especially for city driving conditions.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The link 64 operates lever 57 through a lost motion device D (Fig. 7) serving to normally connect these parts as a solid member but affording thrust of link 64 forwardly after lever 57 has engaged its limiting stop 58 to effect the kickdown control on the transmission. Thus link 64 has its forward end slidable in guide 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yielding of spring 69 while the throttle valve remains fully open. On release of the accelerator pedal, springs 69 and 62 both act until collar engages the rear flange 72 of bracket 71 and thereafter, throughout the normal range of throttle adjustment, spring 62 alone serves to restore pedal 59 and close the throttle valve.

The kickdown range of accelerator pedal movement is utilized to momentarily unload the engine of its drive, as by shorting the ignition, and to effect disengagement of the synchronous clutch sleeve for a change in the transmission from direct to underdrive accommodated by unloading the clutch sleeve of the engine drive. The throttle being open will cause the engine to rapidly speed up as soon as the ignition circuit is restored, the underdrive being automatically effective as will presently be more apparent.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77. The ignition circuit, after interruption during kickdown, is not dependent for restoration on release of the pedal 59 but is restored by other means presently described.

We preferably transmit the drive from the engine A to transmission D through clutch means comprising a fluid coupling B of the kinetic type preferably in conjunction with a releasable clutch C of a conventional design employed to facilitate manual shifts in transmission D and to accommodate stopping the car in gear without tendency of the coupling B to cause the car to creep especially where the idle is set "fast" (as during winter starting) or where the throttle is accidently opened.

The engine crankshaft 78 drives the coupling impeller 79 to circulate the fluid in its vaned passages to drive the vaned runner 80 in a manner well known for fluid couplings of the type illustrated. The rubber 80 drives the clutch member 81 of the friction clutch C of commercial design. Driven clutch disc 82 is fixed to intermediate drive structure or shaft 83 and is drivingly disengaged by depressing a clutch pedal 84 (Fig. 1) which slides throw-out 85 forwardly to operate levers 86 to unload driving pressure plate 87, springs 88 loading this plate and engaging the clutch when pedal 84 is released.

Shaft 83 extends rearwardly into the housing 89 of transmission D (Fig. 9) where it is formed with a main drive pinion 90 and a set of external driving teeth certain of which slidably fit internal clutch teeth of the synchronous coupling clutch sleeve F so that sleeve F turns with transmission driving shaft 83 but may slide rearwardly from its Fig. 9 position relative thereto.

The drive pinion 90 is hollow and journals, by a bearing 92, the forward end of the transmission driven structure or shaft 93 which may carry a propeller shaft brake drum 94 having the braking mechanism generally designated at 95 operably associated therewith. The drive pinion 90 is continuously meshed with a gear 96 for driving the countershaft cluster 97 rotatable on a countershaft support 98. The cluster 97 has a forward extension 99 journalled at 100 within gear 96 and between these parts 99 and 96 there is provided an overrunning clutch G (Figs. 9 and 14). The usual speedometer drive gears are shown at 100$^a$ fixed to shaft 93 and 100$^b$ for driving the speedometer cable.

The clutch G comprises a driving cylinder clutching member 101 formed within gear 96, and an inner driven cammed member 102 formed on extension 99. Rollers 103 are disposed between clutch members 101 and 102 such that these rollers are wedged to clutch these members together when the gear 96 tends to rotate faster than extension 99 in the direction of forward drive of the car while allowing the extension 99 to freely overrun gear 96. Assuming the usual clockwise direction of driving shaft 83, when looking from the front to the rear, then clutch G engages when as viewed in Fig. 14 the gear 96 tends to rotate clockwise faster than extension 99. A cage 104 positions the rollers 103 in proper spacing, a spring 105 yieldingly urging the rollers in the direction of their engagement as is customary in overrunning clutches.

The cluster 97 is further formed with reduction gears 106, 107 and reverse gear 108, these three countershaft gears being of relatively decreasing diameter in the order mentioned. Gear 106 is in constant mesh with a gear 109 which is freely journalled on driven shaft 93. This gear has a forward extension formed with a set of external clutch teeth 110, 110$^a$ and a friction cone clutch member 111, the gear having a rear extension also formed with a set of clutch teeth 112 and friction cone clutch member 113. Teeth 110 are relatively long and alternate with relatively short teeth 110$^a$.

The gear 107 is constantly meshed with a low speed gear 114 freely journalled on the driven shaft 93 and having a forward extension likewise formed with clutch teeth 115 and cone clutch member 116. The reverse gear 108 is adapted to mesh with a reverse idler gear 117 (Figs. 10 and 11) when the latter is slid forwardly on its countershaft 118. At such time the idler 117 also meshes with a gear 119 fixed on the driven shaft 93.

The arrangement is such that shaft 93 may be selectively clutched at the will of the driver with gears 114 and 109, the control comprising a manual remote shift. The operation of clutch sleeve F is, on the other hand, automatic in the operation of clutching driving shaft 83 with gear 109 or disconnecting these parts. The manual clutching control comprises the following mechanism.

Fixed to driven shaft 93 is a hub 120 (Figs. 9 and 19) formed with external teeth 121 slidably engaged with the internal teeth 122 of the shiftable clutch sleeve H adapted for forward and rearward shift by a yoke 123 fixed to a longitudinally extending shift rail 124 disposed to one side of shaft 93 adjacent the side opening 125 of casing 89.

Synchronizing blocker rings 126, 127 are respectively disposed between gears 109, 114 and hub 120 and are driven with hub 120 with slight rotative clearance. These blockers have cammed teeth 128, 129 having a pitch circle the same as that of sleeve teeth 122 and teeth 112 and 115 and they are adapted to frictionally engage the clutching members 113 and 116 respectively. If desired, energizing springs 130 may be provided between the blockers to lightly urge them into engagement with cones 113 and 116 respectively so that the blocker teeth 128, 129 are misaligned with the sleeve teeth 122 thereby preventing shift of sleeve H as long as the parts to be clutched are rotating at different speeds. The synchronizing blocker rings are more fully described and claimed in the copending application of O. E. Fishburn, Serial No. 180,840, filed December 20, 1937, now Patent No. 2,333,165, dated November 2, 1943.

When sleeve H is moved forwardly, teeth 122 engage the cammed ends of blocker teeth 128 thereby urging the blocker under pressure engagement with cone 113 to synchronize gear 109 with shaft 93 (clutch C being released during manual shift of sleeve H to facilitate the clutching action). Then the blocker 126 will rotate slightly relative to hub 120 to permit the sleeve teeth 122 to pass through blocker teeth 128 to engage teeth 112 to positively clutch shaft 93 with gear 109. The rearward shift of sleeve H to clutch with teeth 115 of gear 114 is synchronously effected under control of blocker 127 in the same manner.

The yoke 123 is provided with a boss 131 below rail 124 (Figs. 10 and 11), this boss having a slot 132 adapted to be engaged by an inwardly extending pin 133 carried by a lever 134. This lever has a lower end 135 adapted to engage a slot 136 of a yoke 137 fixed to the reverse shift rail 138 parallel to and below rail 124. The yoke 137 engages the collar portion 139 of the shiftable reverse idler gear 117. Rails 124 and 138 are interlocked by plunger 140 to prevent their simultaneous displacement.

Lever 134 is supported between its ends by a pin 141 parallel to and above rail 124, this pin being carried by the yoked inner end 142 of a shaft 143 rotatably mounted in the boss 144 of a cover 145 secured by fasteners 146 to the opening 125 of casing 89. The shaft 143 has its axis extending across the axis of movement of the rails 124 and 138 and has a lever 147 fixed to its outer end outside of the cover 145. A spring 148 reacts on shaft 143 and yieldingly urges lever 134 clockwise (Fig. 10) about pin 141 tending to maintain pin 133 engaged in slot 132, and end 135 free from slot 136. A spring pressed ball detent 149 yieldingly maintains rail 124 in neutral, forwardly (to clutch sleeve H with teeth 112) or rearwardly (to clutch sleeve H with teeth 115) by engagement of this ball detent with the rail recesses 150, 151 and 152 respectively. The reverse rail 138 has neutral and reverse positioning recesses 153, 154 respectively engaged selectively by a spring pressed ball detent 155 shown in Fig. 19.

The upper end of lever 134 has a wide face 156 engageable with the inner end of a plunger 157 slidable inwardly through cover 145 by a Bowden wire operating mechanism 158. When the wire 158 is pushed, the plunger 157 engages lever face 156 to swing the lever 134 so that the end 135 engages slot 136 while pin 133 disengages slot 132. In such position, the shaft 143 may be rotated to shift rail 138 to mesh reverse idler 117 with gears 108 and 119 for the reverse drive. The plunger 157 maintains a sliding engagement with lever face 156 during this rotation of shaft 143. The remote control mechanism for effecting control of lever 147 and Bowden wire 158 will now be described (Figs. 1 and 3–6).

The fixed steering post 159 houses the usual steering shaft 160 operated by hand steering wheel 161. Rotatably journalled within post 159 is a hollow shaft assembly 162 connected by pivot pins 163 with the yoked inner end 164 of the manually operable selector element or shift lever 165 which extends outwardly through an arcuate opening 166 formed in the head 167 fixed to post 159. Movement of lever 165 fore and aft about the axis of shaft 162 will oscillate this shaft while movement of the lever up and down will rock the lever about a fulcrum 168 to cause reciprocation of shaft 162 in the direction of its axis.

At the lower end of shaft 162 there is a lever 169 fixed thereto, this lever having an intermediate wide face portion 170 always engaged by the upper end of a plunger 171 fixed to the forward end of Bowden wire 158. A spring 172 operates to yieldingly urge plunger 171 engaged with the lower surface of portion 170 and plunger 157 positioned as in Fig. 10 free of lever face 156. A link 173 has its forward end pivotally engaged with the outer end of lever 169, the rear end of this link being connected with a bell crank lever 174 mounted on engine A at 175. The bell crank operates a second link 176 which has articulated connection with lever 147.

In order to shift sleeve H with the teeth 115 of the low speed drive gear 114, the operator disengages the main clutch C by depressing pedal 84, and then swings lever 165 forwardly or counterclockwise from neutral as viewed in Fig. 4. This pushes the lever 147 for rearward swinging movement serving to shift rail and sleeve H rearwardly. Pedal 84 is then released for the low drive. Shift of lever 165 rearwardly will slide rail 124 and sleeve H forwardly to clutch with the teeth 112 of the gear 109 to obtain the third speed ratio of the four available forward speeds.

In order to effect the reverse drive, the lever 165 is first rocked upwardly in neutral to thereby push downwardly through shaft 162 to cause lever portion 170 to operate through the Bowden wire 158 to swing lever 134 to engage lever end 135 with slot 136. Then the lever 165 is shifted rearwardly to cause lever 147 to rock the lever 134 to effect forward shift of rail 138 and idler 117 into mesh with gears 108 and 119. The clutch C is preferably released to effect manual shifts of sleeve H and reverse idler 117.

Blocking means is provided to limit rearward shift of clutch sleeve F whenever shaft 83 and gear 109 are rotating at different speeds, the blocking action being such that the sleeve F will clutch only when the engine is coasting. The details of the blocking means is best shown in Figs. 15–18, the arrangement providing improved blocker action with ample clearance at the blocker teeth without excess backlash when sleeve F is fully clutched with teeth 110, 110ª.

The rear end of shaft 83 beyond pinion 90 is externally toothed, every other tooth being cut away, to provide spaces 177 between driving teeth 178. The clutch sleeve F has internal teeth formed in a repeating pattern best shown in Figs. 16, 16A and 17. Every sixth tooth 179 is relatively long and engages one of the teeth 178. Spaced equally between each pair of adjacent teeth 179 is a tooth 180 also engaging a tooth 178. The teeth 180 are cut back at their rear ends so that they are of somewhat less length than the teeth 179. Between adjacent pairs of teeth 179, 180 are the blocked teeth 181, 181ª. These teeth have at least one of their side faces in sliding engagement with a tooth 178. The pairs of teeth 181, 181ª are spaced apart to receive the blocker teeth therebetween. The teeth 181ª are longer than teeth 181 and their rear ends are preferably cammed or bevelled at 183 so that the high portion of their rear faces forms the advancing portion of these teeth with respect to the forward direction of rotation. Therefore, one tooth 181ª of each pair of blocker-engaging teeth 181, 181ª extends rearwardly axially beyond the other tooth 181 of such pair so that for convenience of reference teeth 181ª may be said to be longer than teeth 181 although obviously the forward ends of teeth 181 and 181ª may not be circumferentially aligned.

A blocker synchronizing ring 184 lies between the gears 109 and 90 and comprises a friction cup clutching surface 185 which may be formed as a fine thread as disclosed in the aforesaid Fishburn application, or plain if desired, to engage the surface of cone 111 to obtain the blocker action. The blocker ring is formed at its rear end with upstanding blocker teeth 186 having cammed or bevelled forwardly directed end portions 187 (when teeth 181ª are bevelled at 183) and flat portions 187ª respectively engageable with the cams 183 and flat ends of sleeve teeth 181ª and 181. The blocker ring rotates with the driving shaft 83 and sleeve F with relative rotation accommodated so that blocker teeth may move between the solid line and dotted line showing 186' in Fig. 16 at which times the blocker teeth are axially aligned with blocked teeth 181 and 181ª respectively.

The blocker ring drive is provided by a plurality of upstanding lugs 188 formed as a part of ring 184. Ordinarily two lugs are sufficient, disposed at diametrically opposite points. The rear edge of the driving shaft is cut or notched at 189 to receive a lug 188 with sufficient clearance circumferentially to allow the blocker teeth 186 to rotate relative to the sleeve teeth within the aforesaid limits. A plurality of light springs 190 may be provided between the driving shaft 83 and blocker ring 184 to urge the blocker surface lightly into frictional engagement with cone 111 so that the blocker ring tends to rotate with gear 109.

From the foregoing it will be apparent that whenever the speeds of shaft 83 and gear 109 are different from each other, the blocker ring 184 will move into position to block rearward shift of sleeve F. In Fig. 16, the sleeve F is in its disengaged forward position, the blocker ring tending to lag behind the driving shaft 83 and sleeve F which is the condition when the gear 109 is rotating slower than the driving shaft and when the sleeve is not urged rearwardly. When gear 109 rotates faster than the driving shaft, as when the engine coasts, then the friction drag at cone 111 drags the blocker ring rotatably forwardly (clockwise looking front to rear) ahead of the driving shaft until the lugs 188 engage the ends of slots 189 opposite to end engaged in the Fig. 16 showing. At this time the blocker teeth are at position 186'. In either instance rearward shift of sleeve F is blocked by the blocker teeth 186.

The arrangement is such that the sleeve teeth 181, 181ª will not shift rearwardly of the blocker teeth 186 except when the engine and sleeve are coasting. Therefore, whenever the engine is driving the car and the sleeve F shifts rearwardly, the sleeve will be blocked against ratcheting with teeth 110, 110ª. Furthermore, clutching of sleeve F is limited to coasting down of the engine to synchronism with teeth 110, 110ª from a condition where the engine and sleeve F were rotating faster than the teeth 110, 110ª.

The means for urging sleeve F rearwardly will be presently described. However, let us assume at this time that a force is applied rearwardly to sleeve F while the sleeve is in the Fig. 16 position of release. Several conditions may arise depending on whether the engine is driving or coasting. Let us first assume that sleeve F is urged rearwardly while the engine is driving the car in a reduction drive ratio as when the driving shaft 83 and sleeve F are rotating forwardly faster than gear 109. Under such conditions the blocker 184 will lag sleeve F and the blocker teeth 186 and lugs 188 will be positioned as in Fig. 16 (solid lines). Now as the sleeve F moves rearwardly, the teeth 181 will strike teeth 186 and further shift of the sleeve will be blocked as long as the engine continues to drive in this relationship. This condition is shown in Fig. 16A which may be said to represent an intermediate or blocked position of the sleeve at the time that the sleeve is rotating faster than gear 109. If now the accelerator pedal is released to allow the engine to coast, while gear 109 continues to freely rotate, the sleeve F will rapidly slow down until it synchronizes with gear 109. Then, as the sleeve starts to drop below the speed of gear 109, the blocker 184 will rotate with this gear and the sleeve will lag the blocker by an amount equal to half the total travel of lugs 188 which total travel is from the solid line position to the dotted position 188' of Fig. 16. The half travel is indicated by the position of lugs 188 in Fig. 17. This is necessarily so because of the long teeth 181ª the rear ends of which (Fig. 16A) axially overlap the blocker teeth 186 so that the sleeve lags only until these teeth 181ª strike the sides of the blocker teeth at this approximately synchronized condition between the sleeve F and gear 109. As soon as this condition is reached the sleeve F moves rearwardly so that the blocker teeth 186 pass between adjacent teeth 181, 181ª and the long teeth 179 will each enter a space between the long teeth 110 so as to glance off a short tooth 110ª. The short teeth 110ª in conjunction with long teeth 179 insures initial clutching of the sleeve F and gear 109 on the coast and furthermore provides for an initial clutching without shock, jar or damage to the clutching parts or other parts of the car mechanism; the engagement is also so smooth as not to jolt the car occupants. Thus, the long teeth 179 are caught between pairs of adjacent long teeth 110 for initial clutching and short teeth 110ª afford additional drive contact with the sleeve when fully clutched (Fig. 17) and also serve to cushion the initial clutching inasmuch as they limit teeth 179 from entering too far between teeth 110 during the initial clutching action. As the long teeth 179 glance off the teeth 110ª, the engine coasts down slightly more until the teeth 179 strike against the sides of teeth 110ª and at this time the engine cannot coast down any more relative to gear 109. Any continued coast of the engine will simply serve as a brake on the car travel or in other words the engine cannot then slow down except as permitted by the car slowing down with it. During such further coast the drive friction from teeth 110 to teeth 179 will ordinarily prevent the full or secondary clutching movement of sleeve F as the force applied to shift sleeve F is ordinarily be preference not sufficient to overcome this friction but the next time the torque is reversed between sleeve F and gear 109, as when the engine is speeded up to take over the drive, then the sleeve will instantly shift fully rearwardly to the Fig. 17 position. As the torque changes from coast to drive, the teeth 179 cannot jump ahead beyond a short tooth 110ª because of the impressed rearward force on sleeve F which will shift the sleeve the instant the sleeve teeth are unloaded and also because on coast, the teeth 179 will enter a slight distance between a pair of teeth 110, 110ª before further rearward movement of sleeve F is prevented by the coast friction between teeth 110 and blocker teeth 186. If, during the coast when blocker teeth 186 first enter the spaces between teeth 181, 181ª, the teeth 179 strike the ends of teeth 110, then the sleeve will slide off these teeth 110, glance off teeth 110ª, and engage the sides of the next teeth 110 for the initial clutching. The long teeth 179 will in any event insure clutching on coast between the sleeve F and gear 109 at approximately a condition of synchronism between these parts.

From the foregoing it will be apparent that the long teeth 179 function as primary engaging teeth and the teeth 180, 181ª function as secondary engaging teeth in that initial clutching is effected first of all by engagement of the primary teeth 179 with the longer teeth 110 of gear 109 followed by engagement of the pairs of secondary teeth 180, 181ª with the teeth of this gear as in Fig. 17. Here again, for convenience of reference, teeth 110, 110ª may be respectively designated as long and short teeth to conveniently define their difference in lengths radially in the direction of the driving shaft 83.

Now let us assume that the force applied rearwardly to sleeve F occurs at a time when the sleeve lags the blocker. This condition most commonly will occur when manual change speeds are manipulated in the transmission above certain car speeds, during which time, as will presently be apparent, the clutch C is disengaged and sleeve F is thereby unloaded. During such manual shifts, the engine slows down while the car continues to travel so that the sleeve will lag the blocker and a condition will arise that the sleeve is urged rearwardly while the blocker teeth and drive lugs are disposed as at 186' and 188' (Fig. 16) with respect to sleeve F. Under such conditions the teeth 181ª will almost immediately engage teeth 186 and the sleeve will be blocked because the main clutch C will be engaged (provision being made such that sleeve F is not urged rearwardly until after clutch C is engaged from a position of release) and the low cam angle at 183 and 187 will not be sufficient to turn the blocker backwards against the thrust at friction surfaces 111, 185. This is an important relationship in insuring against attempted clutching of sleeve F with teeth 110, 110ª at this non-synchronized time and we have found that an angle of about 15° at 183 and 187 will block the sleeve at this time. (The main function of the cammed surfaces 183 and 187, when the cams are employed, will presently be apparent in conjunction with getting a dead engine started by towing the car.) Now, with the sleeve teeth 181ª blocked by the blocker teeth at positions 186' as when the engine is coasting, let us assume that the engine is speeded up. This will cause the sleeve to rotate ahead of the blocker until lugs 188 engage the following ends of slots 189 as in Fig. 16 and the sleeve will move rearwardly until the parts are positioned as in Fig. 16A with teeth 181 blocked by teeth 186. The function of the short teeth 181 relative to long teeth 181ª will now be apparent because as the sleeve F moves ahead of the blocker, teeth 181ª slide off the ends of teeth 186 but the blocker teeth do not have time to enter the spaces between teeth 181, 181ª but instead, the blocker teeth jump these spaces and block teeth 181 which are made sufficiently shorter than teeth 181ª to insure this action. When the parts assume the Fig. 16A positions, then on slowing down the engine the clutching of sleeve F will occur during the coast just as in the foregoing example of a typical clutching of the sleeve.

The automatic control for shifting sleeve F will now be described. This sleeve has a shifting groove 191 engaged by a shift yoke 192 which extends upwardly and outwardly (Figs. 12, 14 and 19) in the casing 89 and then rearwardly in the form of a bar 193 the end of which is bent inwardly at shoulder 194 to slidably receive a shift rod 195. This rod extends longitudinally of the transmission and is guided for reciprocation in the casing brackets 196, 197. The rod also slidably projects through yoke 192. Between shoulder 194 and yoke 192 the rod 195 is grooved at 198 to receive an abutment snap ring 199, a compression spring 200 acting between this ring and the yoke shoulder 194. A stronger spring 201 acts between the fixed bracket 196 and a second abutment ring 202 fixed to rod 195 rearwardly adjacent the yoke shoulder 194 and serving to yieldingly thrust the rod together with the yoke and sleeve F forwardly to the Fig. 9 position. Rearward movement of rod 195 is limited by an abutment 203 engaging bracket 197, the rod being capable of rearward movement in advance of rearward shift of sleeve F.

Rearward shift of rod 195 is effected by power applying means preferably in the form of a pressure fluid motor J (Fig. 12) comprising a cylinder 204 slidably receiving a piston 205 engaged by the forward end of rod 195. A cylinder head 206 limits forward movement of the piston and rod under the action of spring 201. Pressure fluid, preferably oil, is admitted to the cylinder between head 206 and piston 205 through the communicating delivery passages 207, 208.

Figure 20:
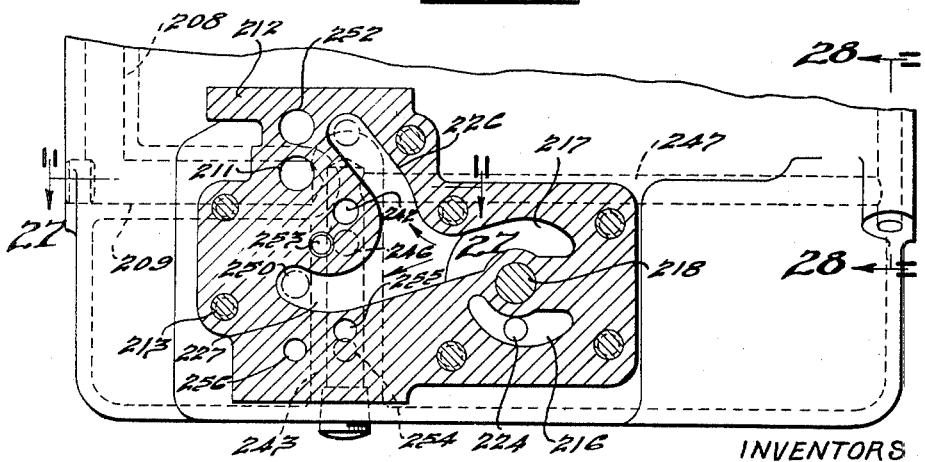
Fig. 20 is a detail sectional view taken as indicated by line 20—20 of Fig. 19 showing the pressure fluid discharge passages from the pump.

The passage 207 extends transversely across the transmission while passage 208 extends downwardly and then rearwardly through a horizontal branch passage 209 (Figs. 14, 20 and 27). The latter passage then branches laterally outwardly at 210 to register with a delivery passage 211 of the valve casing 212 secured to the side of the transmission casing by fasteners 213. The casing 212 houses the valving means generally designated as K.

The oil pressure is developed by a pumping means comprising a pump L (Figs. 19, 21) having an inner driving member 214 and an outer driven member 215 defining intake and delivery chambers 216, 217 respectively. The driving member 214 is secured to a shaft 218 rotatable in a stationary pump housing 219 closed by a cover 220 at its outer end and supported by a casing bracket 221 at its inner end. The inner end of shaft 218 carries a gear 222 meshing with a pump drive gear 223 of the countershaft 97.

The intake chamber 216 receives a constant supply of oil by an inlet passage 224 which opens to the oil reservoir or sump 225 along the bottom of the transmission casing 89. The oil under pressure is delivered from the pump and chamber 217 forwardly through the branched delivery passages 226, 227. The passage 226 communicates with the upper end of a cylinder 228 above a main pressure relief valve 229 urged upwardly by a spring 230 so that when the pump is not delivering oil under pressure the valve stem 231 engages a head 232 as in Figs. 21 and 22.

A second cylinder 233 is formed in casing 212 forwardly of cylinder 228 and communicates therewith by a passage 234. Slidable in cylinder 233 is a valve for controlling oil delivery to motor J and in order to compensate for minor misalignment of the parts this valve is preferably made in two separate pieces 235, 236 although they move together as a unit valve part and could be formed as one piece. Prior to oil delivery (Fig. 21) a spring 237 urges valve part 236 upwardly so that the stem 238 thereof in turn urges valve part 235 upwardly until its stem 239 engages the armature plunger 240 of a solenoid M. In this position of the parts, the chamber 241 of valve part 235 registers with passage 234 so that when oil is delivered by passage 226 into cylinder 228, then valve 229 lowers (Fig. 25) to uncover passage 234 and the oil is delivered through this passage and into valve chamber 241. From this valve chamber the oil flows through the aforesaid passage branch 211 for supply through passages 210, 209, 208 and 207 to motor J for forcing piston 205 and rod 195 rearwardly.

When valve 229 lowers by oil supply from delivery passage 226 (Fig. 25), spring 230 ensures the proper oil pressure delivery through passage 211 for operating motor J, the excess pressure forcing valve 229 down to uncover a passage 242 which leads inwardly (Fig. 26) to the top of a cylinder 243 which has the lubricant control valve 244. This valve thereupon lowers against a spring 245 so that the excess oil from passage 242 flows from cylinder 243 at the drain outlet 246 which leads back to the sump 225. A portion of the oil delivered to cylinder 243 flows under pressure determined by spring 245 through an outlet 247 which extends rearwardly (Fig. 20) to supply lubricant to the working parts of the transmission. When the oil pressure is relieved above valve 244 (Fig. 22) the spring 245 seats the valve stem 248 upwardly at the top of cylinder 243 at which time the valve chamber 249 registers with drain outlet 246 and isolates this outlet from passage 242 so that the lubricating line 247 is filled and placed under pressure before drainage starts.

The oil delivered from the pump L through the lower branch passage 227 enters the cylinder 233 at 250 and with valve part 236 raised (Fig. 21) this oil is trapped by the valve passage 251. The purpose of this arrangement is to ensure supply of lubricant under pressure to the line 247 even when the oil pressure is relieved at the motor J, as during kickdown and at other times presently to be described.

The kickdown position of the valving K is represented in Figs. 23 and 24 wherein the solenoid M has been energized by closing switch 77 as aforesaid. When the solenoid is energized, the armature plunger 240 is forced downward moving the valve parts 235, 236 to the Fig. 23 position against the restoring action of spring 237. This relieves the oil pressure at the motor J by opening the supply passage 210 to a drain outlet 252 at the top portion of cylinder 233. At the same time the valve passage 251 is moved down out of registration with the delivery passage 227 at cylinder inlet 250, the oil flowing from the latter upwardly in cylinder 233 and then into cylinder 228 through a transfer passage 253. The oil then flows upwardly in cylinder 228 and with valve 229 fully raised by spring 230, the bottom of this valve exposes the passage 242 whence the oil flows into cylinder 243 and to the lubricating supply line 247. Therefore this line 247 is supplied with oil under pressure from pump L (when the latter is operating) regardless of whether the solenoid is energized (valve parts 235, 236 raised as in Fig. 25) or de-energized (valve parts 235, 236 lowered as in Fig. 23).

Any oil accumulating in the bottom portion of cylinder 243 is drained back to the sump through a vent passage 254 which has restricted communication with drain passage 255 of cylinder 228. This restricted communication insures an adequate supply of pressure fluid from transfer passage 253 to the lubricating line 247 when the parts are positioned as in Figs. 23 and 24 while providing drainage for the lower end of cylinder 228. Cylinder 233 is drained, below valve part 236, by a drain outlet 256.

The lubricating line 247 (Figs. 20 and 28) extends to the rear of the transmission whence the oil is conducted upwardly and inwardly through casing passage 257 and the registered passage 258 of the fixed support 259 for the driven shaft bearing 260 (Fig. 9). The oil is then delivered to an annular groove 261 in the bearing retainer 262 whence the oil flows inwardly through registering radial passages 263, 264 and 265 respectively formed in retainer 262, bushing 266 and driven shaft 93. This shaft has an axial chamber 267 closed at its rear end by plug 268 and extended forwardly by the reduced passages 269, 270 which conduct oil outwardly at 271 and at the forward end of the shaft 93 for lubricating the various bearings for the gears and other working parts of the transmission.

Whenever the car is being driven, the countershaft 97 is drivingly connected with the driven shaft 93 and this relationship is conveniently utilized for controlling the automatic operation of sleeve F as a function of car speed in the following manner. It is desired to note in passing that the governor control about to be described may, if desired, be omitted although it is included by preference in order to improve the functional operating characteristics of the transmission D.

Referring to Figs. 19 and 29 the pump drive gear 223 drives a gear 272 having a shaft portion 273 which operates a governor switch N of any suitable type. In Fig. 29 the shaft 273 has a head 274 which carries a pair of weights 275 eccentrically mounted by pins 276. The weights are connected by a flexible flat metal member 277 which is normally bowed upwardly (when shaft 273 is rotating below a predetermined speed) to spring the electrical contact 278 into engagement with fixed contact 279 which is grounded at 280. Thus when the car is standing still or when shaft 273 is rotating below a predetermined critical speed, the wire 281 for contact 278 is grounded through engagement of the switch parts 278, 279. When shaft 273 exceeds its critical speed, which may be varied as desired by the arrangement of weights 275 and spring 277, the weights 275 rotate about pins 276 sufficiently to flex the spring 277 downwardly whereupon contact 278 flexes down enough to open the switch by moving out of contact with switch piece 279.

The wire 281 has the branch conducting wires 282, 283. The wire 283 contacts a dash mounted switch 284, the circuit continuing from this switch through wire 285 to a relay. This switch 284 is normally closed and is preferably used only in emergencies so that the engine may be started by towing the car without encountering a free wheeling condition as will presently be apparent. Other functional advantages of the dash switch 284 will be hereinafter referred to, especially in connection with Fig. 42. The switch 284 may be opened to break the current through wires 283, 285 by driver operation thereof.

The wire 281 then continues at 281ª to the kickdown switch 77 which has its other terminal grounded at 286. The usual starter terminal 287 has a lead 287ª to the ammeter 288 the circuit continuing by wire 288ª to the usual ignition switch 289 and extends through primary wire 289ᵃ of the horn and solenoid relay 290, this wire then continuing at 285 to the switch 284.

The terminal 287 is connected to the usual storage battery 291 the other terminal of which is grounded at 292. The terminal 287 also leads through wire 293 to relay movable contact piece 294. The other relay contact piece 295 is connected by conductor 295ᵃ to the solenoid M which is then grounded at 296.

The lead 297 extends from wire 289ᵃ to coil 298 and thence through lead 299 to the engine ignition distributor 300. From the distributor a wire 301 extends through a safety fuse 302 and wire 301ᵃ to a terminal 303 of a pressure fluid operated switch O, having its other terminal 304 connected by wire 305 to the wire 282.

From the foregoing wiring diagram it will be apparent that several circuits are formed.

The clutch pedal circuit for energizing solenoid M extends from the ground 326 through switch P and wires 327, 282, 281, 283, switch 284 and wire 285 to relay 290, thence through 289ᵃ to the ignition switch 289 and ammeter 288, thence to terminal 287, battery 291 and ground 293. The main solenoid circuit which is thereby energized comprises ground 292, battery 291, terminal 287 and thence through wire 293 and relay contacts 294, 295, wire 295ᵃ to solenoid M and ground 296.

The kickdown relay circuit which is closed by kickdown switch 77 and grounded by governor switch N at low speeds for operating the solenoid M comprises ground 286, switch 77, leads 281ᵃ, 281 and 283, switch 284 and wire 285 to relay 290 thence as before through switch 289, ammeter 288, terminal 287, battery 291 and ground 292. At low speeds, instead of this circuit being grounded at 286 through the kickdown switch 77, the ground 280 completes the relay circuit through governor switch N to wire 283, switch 284, wire 285 and relay 290. The aforesaid main solenoid circuit comes into action by either the switch 77 or switch N.

The kickdown ignition circuit which grounds the ignition current after oil pressure is vented at hydraulic switch O and the kickdown switch 77 is closed, comprises ground 286, switch 77 and leads 281ᵃ, 282, 305 to switch O, thence through wire 301ᵃ and fuse 302 to distributor 300, 299 to coil 298, lead 297 and through the switch 289, ammeter 288, terminal 287, battery 291 and ground 292.

The switch O (Figs. 12, 13 and 29) comprises a casing 306 formed with a forward neck 307 threaded for mounting on the head 206. The casing contains the insulating body 308 carrying terminals 303, 304. The terminal 303 has a relatively fixed contact piece 309 and terminal 304 has a movable contact piece 310 carried by a flat flexible spring conductor 311 yieldingly urged outwardly by a spring 312 tending to engage contacts 309, 310 and thereby close the switch.

The switch is normally maintained open by either of two means, viz., the pressure fluid in cylinder 204 or by the piston 205 when in the end of its forward stroke as in Figs. 12 and 13. As will presently be apparent, the engine ignition system may function normally when the switch is open but is momentarily grounded during the time that this switch is closed to cause a reversal of torque through the engine to thereby facilitate kickdown movement of sleeve F. In this manner the normal power delivery of the engine is momentarily interrupted. However, the fluid operated switch O is in series with the kickdown switch 77 so that the ignition is not interrupted until both of these switches are closed.

The switch O is opened by a ball 313 urged forwardly against conductor 311 by a flexible spring diaphragm 314 engaged by a yieldable bumper 315 slidably guided in a plunger 316 which has a flange 317 seated on a wall bounding the fluid chamber 318. A spring 319 acts between bumper 315 and plunger 316 urging the plunger to seat, at which time the rear plunger end projects rearwardly of head 206 and in the path of piston 205 as at 316'. When the plunger 316 is seated, fluid may pass between chamber 318 and cylinder 204 by way of the grooved passages 320, 321.

In the Fig. 13 position, the piston 205 is held forwardly against head 206 by the heavy spring 201 thereby forcing plunger 316 forwardly against bumper 315. This action forces the diaphragm to move the ball 313 forwardly so that conductor 311 is flexed against spring 312 to open the switch, viz., contact 310 disengaged from contact 311. Now if pressure fluid is introduced to cylinder 204 then piston 205 will move forwardly permitting plunger 316 to seat while still maintaining the switch O in its open condition. The fluid enters chamber 318, by the grooves 320 and the pressure holds the diaphragm flexed forwardly while spring 319 moves plunger 316 rearwardly until it seats at flange 317. This rearward movement of piston 205 effects clutching of sleeve F without interrupting the engine ignition. If now, the pressure of the fluid is relieved at cylinder 204, as by closing the kickdown switch 77, the chamber 318 is immediately vented by grooves 321, 320 and spring 312 acts to close the switch at contacts 310, 309. Diaphragm 314 flexes rearwardly against the action of spring 319 to unload ball 313.

Therefore, as soon as the pressure fluid is relieved at the motor J, the switch O is closed to interrupt the engine ignition by grounding the same. This interruption is only momentary because, as soon as the pressure is relieved in cylinder 204 and the ignition is interrupted, then spring 201 is free to force rod 195, piston 205 and yoke 192 all forwardly as a unit, the sleeve F moving forwardly away from engagement with clutch teeth 110, 110ᵃ because the torque reversal unloads the teeth 110, 110ᵃ and the teeth of sleeve F engaged therewith. When the piston 205 nears the end of its forward stroke it engages the plunger end at position 316' and restores the parts to their Fig. 13 position opening switch O and thereby restoring the engine ignition even though the kickdown switch 77 is thereafter maintained open. As a matter of fact the arrangement is, as aforesaid, preferably such that switch 77 is not closed until approximately full release of the accelerator pedal 59 (Fig. 1) when finger 75 snaps the switch closed by the actuator 76.

Returning now to the diagram in Fig. 29, an arrangement is preferably provided such that the solenoid M is energized to vent the motor J during operation of the clutch pedal 84 in releasing the main clutch C. This comprises any suitable type of switch diagrammatically indicated at P having an annular elongated switch conductor 322 slidably engaged in closing the switch by a conductor 323 carried by a rod 324 moved by the lever portion 325 of pedal 84. Conductor 323 is grounded by a wire 326 while conductor 322 is connected by a wire 327 to the aforesaid wires 282 and 305. The arrangement is such that the switch P is closed prior to unloading release of the clutch C. Thus as pedal 84 is depressed, the first part of the movement to the position 84' takes up the clutch operating clearance as at 86' (Fig. 8) during which lost-motion interval the clutch pedal moves conductor 323 into electrical contact with conductor 322 thereby energizing the solenoid M. Continued movement of pedal 84 to position 84'' effects release of clutch C while maintaining switch P closed, conductor 323 sliding along conductor 322.

Because of the difficulty of diagrammatically showing the valving K and other parts in the Fig. 29 diagram, these parts are of slightly rearranged and abbreviated form although functionally operating as in the more detailed showings.

The operation of the power transmission is as follows.

With the car parked, the transmission D will of course be in neutral, with the manually shiftable sleeve H and the automatically shiftable sleeve F positioned as in Fig. 9. The ignition is off at switch 289 and the solenoid M is de-energized, the valving K being positioned as in Figs. 21 and 22.

The engine is normally started with the transmission in neutral. As soon as the ignition switch 289 is closed, preparatory to starting the engine, the solenoid M will be energized, causing the valve parts 235, 236 to move to the Fig. 23 position venting the motor J by establishing communication between delivery passage 211 and vent 252. It may also be noted that at this time the governor switch N is closed as in Fig. 29. The coupling sleeve F remains in its forward released Fig. 9 position. When the engine starts, the forward rotation of the crankshaft 78 drives the pinion 90 through the fluid coupling B and the main clutch C thereby driving countershaft 97 in its normal backward rotation through the overrunning clutch G to drive pump L. For convenience, any part may be said to have forward rotation when it turns clockwise looking front to rear. With the pump operating, pressure fluid is delivered through passage 227 and thence through passages 253 and 242 to the lubricant supply system at line 247 so that as the engine idles, oil under pressure is supplied to the lubricating system at 269, 271. It may be noted that ordinarily the drag effect at coupling B will cause the runner 80 to drive even with the engine idling although, if desired, unloading or other known means may be employed to prevent drive of pinion 90 with the engine idling and the car stationary.

To start in the lowest or slowest driving speed ratio, ordinarily called first, the driver depresses clutch pedal 84 to release the clutch C and then shifts the selector lever 165 forwardly to the low range thereby causing the manual sleeve H to shift rearwardly for blocker synchronizing clutching with the teeth 115 of the low speed gear 114. This shift is facilitated by release of clutch C thereby disconnecting the pinion 90 from the engine A and coupling B.

Depressing the clutch pedal 84 closes the switch P but as the solenoid M is already maintained energized by the governor switch N (with the engine idling) the switch P has no function at this time.

The driver then releases the pedal 84 to engage the clutch C while depressing the accelerator pedal 59 to start the car in first. The drive in first is obtained as follows: pinion 90 drives gear 96 which causes engagement of overrunning clutch G to drive countershaft 97, gear 107 driving gear 114 whence the drive passes through sleeve H and hub 120 to the output shaft 93.

In the event that the car is accelerated in first to a speed sufficient to cause governor switch N to open, thereby de-energizing solenoid M and causing pressure fluid delivery to motor J, the sleeve F will be prevented from shifting rearwardly beyond the Fig. 16A position because the blocker 184 will lag behind the sleeve in blocking position (Fig. 16A).

In order to facilitate a discussion of the control functions, we will assume that the governor switch N is so arranged in relation to particular car and transmission illustrated, that this switch will open when the car is driven in first at 7.5 m.p.h. (miles per hour). Obviously this may be varied as desired but is believed to be an approximately desired condition. Because of the friction lag effect inherent in devices of this character, the governor switch N will close, when its drive shaft 273 slows down from above the aforesaid critical speed of opening, at a corresponding car speed slightly below the assumed 7.5 m.p.h. but for convenience of discussion this lag effect may be ignored. Furthermore, if desired, any well known form of detent means may be employed to control the operating functions of the governor.

The drive in first is a free-wheeling drive below 7.5 m.p.h. car speed because within such limits the governor switch N remains closed and solenoid M is thereby energized to maintain motor J vented, the driven shaft 93 being free to overrun the driving shaft 83 by automatic release of the overrunning clutch G.

When the car is driven above 7.5 m.p.h. in first, this being the normal operation of the car and being one reason for setting the critical speed of the governor switch N at the assumed low car speed, the governor switch opens thereby de-energizing the solenoid whereupon the valving moves from the Fig. 23 position to the Fig. 25 position. This causes the delivery of pressure fluid to motor J whereupon piston 205 and rod 195 move rearwardly compressing springs 201 and 200. The sleeve F will move from the Fig. 16 position to the Fig. 16A position whereupon the blocker 184 prevents further rearward shift of the sleeve. It may also be noted that the fluid switch O remains open after piston 205 moves rearwardly by reason of the fluid pressure in chamber 318 (Fig. 13).

While a car is being driven under the foregoing conditions above 7.5 m.p.h. in first, the shift from first to second is automatic and operates in response to driver release of the accelerator pedal 59 sufficiently to slow down the engine speed to the point where the blocker 184 will release the sleeve F. This is most conveniently accomplished by simply letting up on the accelerator pedal whereupon the speed of the engine quickly drops while the car maintains its speed by reason of overrun at clutch G. As the pinion 90 drops to the speed of gear 109, the sleeve F while urged rearwardly by spring 200 begins to fall behind the speed of the blocker 184 which is rotating at the speed of gear 109 and teeth 181$^a$ strike against the blocker teeth 186 to align the blocker teeth with the spaces between teeth 181, 181$^a$ whereupon the sleeve will shift rearwardly without shock or jar to initially clutch with the teeth 110, 110$^a$ during coast and thereby initially clutch the driving shaft 83 with gear 109 for the second speed drive faster than the aforesaid drive in first. The sleeve F will fully shift rearward to the Fig. 17 position when the driving shaft is next speeded up. Sleeve F therefore clutches during coast and under pressure of the fluid transmitted through the medium of spring 200 which cushions the clutching and greatly increases the life of the clutch teeth.

The drive in second passes from pinion 90 through sleeve F to gear 109 thence to gear 106, countershaft 97, gears 107 and 114, sleeve H, hub 120 and the driven shaft 93. This drive is a two-way drive, clutch G overrunning, and is maintained by the oil pressure at motor J which holds rod 195 and sleeve F rearwardly. The engine is used as a brake during coast in the second speed ratio, the car driving the engine at approximately twice the speed of the driven shaft 93 for the particular gear sizes illustrated.

Coasting in the second speed below 7.5 m.p.h. causes the governor switch N to close thereby energizing the solenoid M and adjusting the valving K from the Fig. 25 position to the Fig. 23 position of venting motor J. However, as the teeth of sleeve F are loaded at teeth 110, 110$^a$ during coast, the sleeve will not move forwardly to its released position until the torque through the transmission is reversed by depressing the accelerator pedal to cause the engine to drive the car. When this takes place, spring 201 acts to move rod 195 and sleeve F forwardly as a unit back to the Fig. 12 position so that car acceleration under such conditions will automatically take place in the first speed ratio. Of course, if the car coast in second does not go below 7.5 m.p.h. then the governor switch N remains open and acceleration of the car will then take place in second without shifting back to low.

In shifting from second to the high range, several different results may be obtained depending for the most part on the car speed (where the governor switch is employed in the system). Incidentally it is noted that the functioning of the governor switch N is the same in second as in first because the countershaft 97 is coupled with the driven shaft 93 through the same gears 107, 114 and sleeve H.

Assuming that the car is travelling below 7.5 m.p.h. in second so that the governor switch N closes to energize solenoid M. The driver depresses clutch pedal 84 (switch P being without function as the solenoid is already energized) to release the main clutch C and he then moves the selector lever rearwardly to the high range position to thereby cause the manual shift sleeve H to move forwardly under blocker synchronizing shift to clutch with teeth 112 of gear 109 whereby this gear is directly drivingly connected with driven shaft 93 through sleeve H and hub 120. The driver then releases the clutch pedal 84 and depresses the accelerator pedal to drive the car in the third speed ratio. The sleeve F will be released in this instance whether the shift is made during coast or drive because the governor switch maintains the solenoid energized and a reversal of torque occurs in either instance to unload the teeth of sleeve F. The drive in third takes place from the main pinion 90 to gear 96 thence through the overrunning clutch G and through gears 106, 109 and directly out to the driven shaft 93.

If, on the other hand, the car is travelling above 7.5 m.p.h. in second then the governor switch N remains open and the solenoid is de-energized to maintain the valving K as in Fig. 25 so that pressure fluid is supplied to motor J holding sleeve F clutched rearwardly. In shifting to the high range under these conditions, the driver depresses the clutch pedal 84 which first closes switch P to energize solenoid M and then releases the main clutch C. The driver then shifts the selector lever 165 rearwardly to the high range as before, to clutch sleeve H with gear 109 and under these conditions the shift will also be made to third under one of the following conditions.

Firstly, if the driver releases the clutch pedal 84 while maintaining the accelerator pedal 59 depressed so that the throttle 56 is opened prior to engagement of clutch C, then third speed is obtained because the blocker 184 will lag and block sleeve F (Fig. 16) prior to de-energizing solenoid M as switch P opens to restore valving K to the Fig. 23 position of supplying pressure fluid to motor J. Under such conditions the car will be driven in the third speed ratio and sleeve F is blocked with the parts as in Fig. 16A.

Secondly, if the driver releases the clutch pedal 84 prior to depressing the accelerator pedal 59 then the third speed drive is also obtained when the accelerator pedal is depressed because in engaging the clutch C, the switch P opens to de-energize solenoid M while the coupling sleeve F lags the blocker 184 (see dotted positions 188' and 186' of Fig. 16) and when the accelerator pedal is thereafter depressed to reverse the direction of torque flow through the transmission (the sleeve F having meantime moved rearwardly slightly until teeth 181a strike blocker teeth 186), the sleeve F will move to the Fig. 16A position because teeth 186 will not have time to enter the spaces between teeth 181, 181a but will jump these spaces as the sleeve speeds up while moving rearwardly.

The illustrated gears are of such sizes so that in the third speed, the critical speed of governor switch is roughly 15 m.p.h. car speed instead of 7.5 m.p.h. as in first and second. The critical speed of the governor shaft relative to its drive shaft 273 will, of course, always remain the same. Therefore the drive in the third speed below 15 m.p.h. is accompanied by free wheeling accommodated by the overrunning clutch G. Under these conditions the governor switch N remains closed to energize the solenoid M and the sleeve F remains disengaged.

When driving in the third speed above 15 m.p.h. the governor switch N is open to de-energize the solenoid and direct drive will automatically be obtained when the accelerator pedal is released for accommodating synchronous clutching of sleeve F. Under such conditions there is no free wheeling in the ordinary sense, the overrunning clutch G allowing the engine and shaft 83 to drop to the speed of gear 109 whereupon clutch F will engage teeth 110, 110a as before.

The shift from third to direct is therefore automatic and is obtained by releasing the accelerator pedal momentarily while driving the car above 15 m.p.h. At the synchronizing point, the blocker 184 will allow the sleeve F to clutch with teeth 110, 110a under pressure fluid of motor J acting through spring 200 as before.

The direct drive is a two-way drive and passes from pinion 90 directly to gear 109 through sleeve F, thence directly to shaft 93 through sleeve H. If the car is allowed to coast below 15 m.p.h. to cause the governor switch N to close and energize solenoid M, then when the accelerator pedal is depressed to unload the teeth of sleeve F this sleeve will shift forwardly providing the drive in third speed.

If desired, the car may be started from rest in third by releasing the main clutch C and shifting the selector lever 165 rearwardly to the high range. The solenoid M remains energized by governor switch N and on releasing the clutch pedal 84 and depressing the accelerator pedal 59, the blocker 184 will lag behind the sleeve F preventing its shift rearwardly when the car is accelerated in third above the speed at which the governor switch N opens, viz., above 15 m.p.h. Direct drive will then result from releasing the accelerator pedal to synchronize sleeve F with gear 109 as before.

The kickdown control functions to stepdown the drive from direct to third or from second to first depending on the setting of the manual shift sleeve H.

Assuming that the car is driving in direct above the critical speed of the governor switch N, viz., above 15 m.p.h. then the driver may obtain third by depressing the accelerator pedal 59 beyond the normal throttle opening range and through the kickdown range overtravelling the wide open throttle position. The kickdown switch 77 is thereby closed to energize solenoid M and operate valving K from the Fig. 25 position to the Fig. 23 position venting the motor J. As soon as the pressure fluid is released at the motor, the fluid switch O closes and with switches 77 and O both closed the engine ignition is grounded thereby effecting a reversal of torque through the transmission as the car now drives the engine. The cylinder 204 being vented and the teeth of sleeve F being unloaded from their immediately preceding condition of driving teeth 110, the spring 201 operates to move the piston 205 and sleeve F forwardly to the Fig. 12 position. As the piston approaches the end of its forward stroke, it engages plunger end 316' and moves the plunger 316 forwardly to open the fluid switch O and thus restore the engine ignition to normal driving operation under the open throttle condition maintained by the fully depressed accelerator pedal 59. The engine rapidly speeds up to engage the overrunning clutch G and the car is then driven in the third speed. This whole cycle of kickdown takes place very rapidly and smoothly and is entirely responsive to the natural movement of the accelerator pedal downwardly into the kickdown range. The kickdown is conveniently used as a faster car accelerating driving for rapidly passing another car, in obtaining more favorable torque multiplication for hill climbing, etc. When the accelerator pedal is released, then the direct drive is automatically synchronously obtained. By preference, the direct drive is not restored after kickdown until the accelerator pedal is substantially fully released, as when finger 74 operates switch arm 76. This prevents undesired operations of the kickdown mechanism and changes in the speed ratio within a narrow range of accelerator pedal movement. Therefore the kickdown switch 77 when closed maintains the solenoid M energized and the valving as in Fig. 23 until the accelerator is approximately fully released.

When driving the car in the second speed ratio above 7.5 m.p.h., the accelerator pedal may be depressed to the kickdown range to effect release of the sleeve F and a drive in first as will be readily understood from the description of the kickdown from fourth to third. Likewise, the second speed is restored upon release of the accelerator pedal.

In order to drive the car in reverse, the driver releases the clutch C and shifts the selector lever from neutral upwardly and then rearwardly to mesh the reverse idler gear 117 with the gears 108 and 119. This reverse drive passes from pinion 90 to gear 96, then through overrunning clutch G and gears 108, 117, 119 to the driven shaft 93. The reverse drive is therefore a free wheeling drive and is illustrated as being of a ratio such that the governor switch N will open at less than 6 m.p.h. car speed to de-energize the solenoid M and effect synchronous clutching of sleeve F with teeth 110, 110a in response to release of the accelerator pedal. If the driver manipulates the reverse drive in this manner than a step-up in reverse is obtained without free wheeling. Such a drive passes through the following parts: pinion 90 through sleeve F to gear 109 thence to gear 106 and through the reverse gear set 108, 117, 119 to the driven shaft 93.

It is sometimes desirable to be able to start the engine by towing the car and we have made provision for this so that the engine may be driven even below the speed at which the governor switch N would normally maintain the solenoid M energized. Under these conditions the dash switch 284 is manually operated to cutout the governor switch N and the clutch pedal switch P. The driver may now release clutch C without energizing the solenoid M and then select the high range by moving selector lever 165 rearwardly. With the clutch pedal maintained in its depressed position, the car is pushed and the pump L will operate to build up pressure fluid as the countershaft 97 will be driven by gears 109, 106. When the pressure fluid enters motor J the sleeve F which lags the blocker 184 will be forced rearwardly so that cams 183 engage cams 187. The sleeve will force the blocker 184 into increased grip with gear 109 (at the friction clutch parts 111, 185) and the sleeve will be forced forwardly by the cams 183, 187 and the blocker teeth 186 will then enter the spaces between teeth 181, 181a so that the sleeve F moves back to clutch with teeth 110, 110a. The sleeve is readily cammed under these conditions because the main clutch is released. The clutch pedal 84 may now be released and the engine driven in the most favorable starting ratio which is direct. After the engine has been started, the driver closes switch 284 to restore the normal control system. While we prefer to employ the cammed tooth faces 183 and 187 we have found in actual practice that manipulation of the controls as aforesaid will cause the sleeve F to engage with the teeth 110 and 110a even when the cammed faces are omitted and the ends of these teeth 181a and 186 are formed blunt just like the remaining teeth. The reason for this is that the blocker will tend to rotate at the speed of gear 109 by reason of the friction at 185 but the sleeve F will be urged faster or ahead of the blocker into non-blocked position by reason of the friction oil drag at overrunning clutch G even though the latter is overrunning, it being remembered that the main clutch is released.

If desired, the car may be accelerated from standstill by depressing the accelerator pedal to the kickdown range and then releasing the pedal to automatically provide a step-up in the drive. Thus, with the engine idling, the driver may depress the clutch pedal 84 and select either the high or low range at selector lever 165 to shift sleeve H rearwardly or forwardly. The governor switch N maintains the solenoid M energized and motor J vented. Then the clutch pedal is released and the accelerator pedal depressed to its kickdown range. Although this closes the switch 77 the engine ignition is not grounded because the fluid switch O is held open by the piston 205. As the car accelerates above the critical speed of the governor switch (7.5 m.p.h. in first and 15 m.p.h. in third) the governor switch opens but the solenoid remains energized as the switch 77 is closed. On release of the accelerator pedal above the governor critical speed, the solenoid is de-energized and pressure fluid supplied to motor J caused sleeve F to engage teeth 110, 110a under synchronizing control by the blocker 184.

The transmission has certain other novel shift-down charcteristics whereby a change may be readily effected from a faster to a slower drivng ratio. When driving in direct or second, the driver may depress the clutch pedal 84 to energize solenoid M and release the main clutch C. This releases the sleeve F and affords free wheeling at clutch G. Then the selector lever may be easily shifted forward to the low range, assuming this lever was rearward, and the car is in first. Now, assuming that the speed of the governor shaft 273 is above the critical speed of the governor switch N so that this switch is open, release of the pedal 84 will provide first regardless of whether the clutch pedal is released prior or after depressing the accelerator pedal just as selection to the high range provides third as aforesaid. The action of the sleeve F is similar in both instances.

The transmission arrangement is such that undesired backward roll of the car is prevented. For example, when driving up hill in second or direct the sleeve F is, of course, clutched and the sleeve will not be disengaged if the car stops with the engine continuously pulling because the fluid coupling B continues to slip and there is no possibility of the direction of torque through the transmission to reverse. The engine continues to exert its torque on the coupling sleeve F and the foregoing functions produce in effect a no-back.

In general it may be noted that the governor switch N automatically directs the shift from fourth or second into third or first when the car slows down somewhat below the opening speed of the governor switch due to the aforesaid friction lag effect, energizing the solenoid M venting motor J whereby spring 201 disengages the sleeve F under light coasting torque. Therefore whenever the car is brought to a "temporary" stop, such as a stop made at a traffic light, the governor switch N effects venting of the motor J. This provides a step-down to a slower transmission speed automatically on coast down in direct or second for rapid starting in third or first without releasing the main clutch C and with the fluid coupling B advantageously contributing to the accelerating characteristics for the car. Any tendency of the car to creep while stopping in third or first may be prevented by light application of the car brakes.

The governor switch N in conjunction with the hydraulic switch O functions to prevent interruption of the engine ignition system, by kick-down operation of switch 77, below a vehicle speed where the engine might have a tendency to stall. Where a fluid coupling is employed, there is a tendency for the engine to stall if the ignition is momentarily interrupted at low speed. With our arrangement, stalling tendency is prevented because at low speed the governor switch N closes to energize solenoid M thereby causing piston 205 to open hydraulic switch O. As the latter switch is in series with switch 77 in the kick-down ignition interrupting circuit, operation of switch 77 at low speed will not close this circuit and stalling is prevented.

The governor switch N furthermore acts to prevent the car from tending to get into a locked-up condition as when, for example, without the governor the car is driven into an obstacle, such as a wall, under drive load with the sleeve F engaged and the usual car bumpers applying backward loading on the car. The sleeve would still be loaded, thereby preventing shifting the transmission out of the forward drive condition at sleeve H. Forward drive of the car is, of course, impossible under these conditions as the transmission would be locked up within itself. However, we have found in actual practice that even without the governor switch N the sleeve F will release by the engine unloading the sleeve teeth accommodated by slight movement of the parts of overrunning clutch G under the aforesaid conditions. However, the governor switch N serves to more rapidly vent motor J than would be the case where the pump L is simply stopped and its use is therefore preferred.

Referring now to Figs. 30 to 36 we have illustrated a modified embodiment of our invention comprising a somewhat different arrangement for controlling the synchronous clutching of the automatic coupling sleeve in transmission D'. Also, the governor switch N and dash switch 284 are now omitted and we have incorporated a novel form of no-back control. This modified embodiment functions otherwise just as the preceding embodiment and diagrammatically is the same as Fig. 29 except that governor switch N and switch 284 are omitted. In this case the wire 281 leads directly to wire 285 of relay 290. For the most part, therefore, the parts are identical to the main embodiment and a duplication of disclosure will not be necessary.

In Fig. 30 the main drive pinion 90ª of the driving shaft 83ª has an extension which itself is formed with the blocker teeth instead of these teeth being formed on a separate blocker ring movable with rotative clearance relative to the driving shaft as in Fig. 15. In Fig. 30 the coupling sleeve F' is capable of limited rotation relative to the driving shaft to obtain the synchronous blocking action. Furthermore, we have provided an overrunning clutch operable between the coupling sleeve and the driven member such as gear 109ª which otherwise is identical to the corresponding gear 109 of Fig. 9. The overrunning clutch is of the "reverse" type in that it is free to allow the engine and driving shaft to rotate faster than the driven gear 109ª but prevents the driven gear from going faster than or overrunning the driving shaft.

The gear 109ª has the forward extension 328 which forms one clutching part of an overrunning clutch Q of the aforesaid reverse type. According to the present illustrative embodiment the part 328 is externally cylindrical and is engaged by the clutching rollers 329 which also engage the internal cams 330 (Fig. 34) of a sleeve-carrying hub 331 which forms the other clutching part of clutch Q. The hub 331 is internally splined at 332 to engage splines 333 of the driving shaft rearward extension 334, limited rotative blocking clearance 335 being provided between these splines to accommodate limited rotation of hub 331 relative to the driving shaft. The extension 334 provides means for drivingly connecting the blocker teeth 186 with the driving shaft 83ª. A spring 336 (Fig. 33) acts between driving shaft extension 334 and hub 331 such that the hub is yieldingly urged rotatably backwards (opposite to the forward rotation of the driving shaft) relative to the driving shaft tending to engage clutch Q and to cause the hub to lag the driving shaft as in Figs. 32, 33.

The driving shaft extension 334 forms a cage for the rollers 329 by reason of the roller-receiving recesses 337 which are circumferentially wider than the rollers to provide the clearance 338 therewith at each of the recesses. The extension 334 is flanged outwardly rearwardly of the rollers 329 and is formed with the aforesaid blocker teeth 186 cooperating just as before to control the rearward shift of the teeth of sleeve F' to clutch with the teeth 110, 110ª of gear 109ª. The sleeve F' has its internal teeth splined without rotative clearance with the external teeth of hub 331 just as the sleeve F was splined to the driving shaft 83 in Fig. 15 except that now there is no blocker ring 184 or recesses 189 to drive the blocker lugs 188 as aforesaid. Instead, the blocking action is obtained by the relative rotative movement at clearance 335 between hub 331 and the driving shaft as will presently be more apparent.

In the Fig. 30 arrangement, the blocker teeth 186 are now directly drivingly connected to the driving shaft 83ª and in order to limit clutching shift of the automatic coupling sleeve F' to the condition of engine coast down to the speed of gear 109ª and prevent clutching shift of this sleeve at the time of speeding up the engine from a condition of coast, we have employed the same arrangement of blocking action as in Fig. 17 although for the Fig. 30 arrangement the sleeve teeth are just reversed in the repeating pattern as shown in Fig. 31a. The clutching action of sleeve F' is identical with that described for sleeve F. On coast, sleeve F' being urged rearwardly when the engine is driving so that blocker teeth 186 lead the sleeve teeth and block teeth 181, the driving shaft 83ª slows down from its drive condition (spring 336 maintaining hub 331 in relation to driving extension 334 as shown in Fig. 32) until the driving shaft reaches the speed of extension 328. Then a slight further slowing down of the driving shaft causes extension 328 and hub 331 to pinch or engage rollers 329 locking the sleeve F' synchronized with extension 328 while the driving shaft slows down taking up a part of clearance 338 sufficient to move blocker teeth 186 off of the ends of teeth 181 so that the blocker teeth engage the sides of teeth 181ª and the sleeve shifts rearwardly as before. When the blocker teeth lag the sleeve, as at 186', rearward shift of sleeve F' is prevented as the engine speeds up because the blocker teeth will move from the ends of teeth 181ª and jump over to the opposite blocking position to engage the ends of teeth 181 just as for the Fig. 16 arrangement. In Fig. 30 the engaging ends of teeth 186 and 181ª may now be blunt because the engine may be started by towing the car by first shifting sleeve H either forwardly or rearwardly, the overrunning clutch Q acting to couple gear 109ª with shaft 83ª independently of clutching shift of sleeve F'.

The transmission D' also differs from the aforesaid transmission D in that we have now provided a novel no-back mechanism R best shown in Figs. 30, 35 and 36. The output shaft 93 forms the inner cylindrical clutching member of an overrunning control device S, the outer member 339 of which is internally cammed at 340. Rollers 341 are disposed in recesses 342 of a cage 343 which is securely fixed to the casing of transmission D'. The outer member 339 is journalled for slight rotative adjustment in the cylindrical journalling portion 344 of a housing 345 which is also fixed to the transmission casing.

Each of the cams 340 is so constructed that when member 339 is held in the typical cam position 346 illustrated in Fig. 35, shaft 93 is free to rotate in its normal forward direction to drive the car forwardly but reverse rotation of this shaft is prevented as then the rollers 341 are wedged between the shaft and cams 340 thereby providing a no-back preventing backward roll of the car. To facilitate the wedging engagement and release of rollers 341, each recess 342 has a spring 347 yieldingly urging the associated roller toward its wedging position in a direction opposite to the forward rotation of shaft 93 which normally holds the rollers free from wedging. Each recess has a clearance 348 accommodating wedging movement of the associated roller when shaft 93 tends to rotate backwards.

There are, of course, times when it is desired to rotate shaft 93 backwards as when it is desired to drive the car in reverse. In order to accommodate such drive we have provided means for rotating the member 339 slightly in a counterclockwise direction (Fig. 35) so that the neutral portion 349 of each cam 340 is brought to the position indicated at 346. When member 339 is so adjusted then the rollers 341 cannot be wedged by rotation of shaft 93 either forwards or backwards.

In order to control the adjustment of member 339 as a function of forward and reverse drive setting of the transmission, this member has an irreversible screw adjusting connection 350, 351 with a rotatable shaft 352. This shaft is disposed upright tangentially to member 339 and is journalled in housing 345 which carries the fasteners 353 for taking the end thrust of shaft 352.

Near its lower end shaft 352 is formed with a gear 354 meshing with a plain rack 355 whose shaft 356 is a rearward extension of the reverse shift rail 138 (Figs. 10, 11). When rail 138 is adjusted forwardly to mesh the reverse idler 117 with gears 108, 119 to establish the reverse drive, then rack 355 is pulled forwardly to rotate shaft 352 so that the screw connection 350, 351 adjusts member 339 to its neutral position thereby allowing shaft 93 to be freely reversed. After returning the rail 138 to its Fig. 11 position, the member 339 is restored to the Fig. 35 position and held in this position. If the rollers 341 are wedged at the time that the reverse setting is made in the transmission, it will be apparent that reverse shift of rail 138 is not opposed by the counterclockwise load on member 339 but is augmented thereby as this member is then adjusted in the direction of such loading. Furthermore, all thrusts on member 339 are self-contained in the casing 345 by reason of nuts 353 so that the rail 138 is unloaded insofar as the action of the no-back device S is concerned.

The further operation of transmission D' will now be outlined as to those characteristics which differ from the operation of the main embodiment comprising transmission D.

When the engine is started and as it idles, the solenoid M is now de-energized as there is no governor switch in the system. Therefore the pump L builds up pressure at motor J but sleeve F' cannot shift rearwardly under the action of spring 200 because the sleeve lags the driving shaft at clearance 335 and blocker teeth 186 prevent the sleeve shift, teeth 181 engaging teeth 186.

To start in first, the clutch pedal 84 is depressed to release clutch C, the selector lever 165 is then shifted forward to engage sleeve H with teeth 129 and the clutch pedal is released. When pedal 84 is depressed, switch P closes and, as before, brings about the venting of motor J to ensure release of sleeve F'. The drive is now through overrunning clutch G just as for transmission D except that now the overrunning clutch Q overruns. Although driving shaft extension 334 is rotating faster than part 328, rollers 329 cannot move into wedging relation with cams 330 because hub 331 can lag the driving shaft only the amount of the blocker clearance at 335.

This drive in first is not a free wheeling drive in the ordinary meaning of the term because release of the accelerator pedal allows the driven shaft to overrun the driving shaft only until the speed of the engine drops to the speed of the gear 109$^a$ whereupon the second speed is automatically obtained just as before by synchronous clutching of sleeve F' with teeth 110, 110$^a$.

The shift from first to second is therefore automatically responsive to releasing the accelerator pedal. While clutch G overruns, the coasting driving shaft and hub 331 drop in speed while maintaining their positions illustrated in Figs. 32 and 34 until the speed of the driving shaft at extension 334 equals the speed of part 328 which remains substantially constant. At this time hub 331 is ready to wedge rollers 329 which it does as the hub tends to drop below the speed of part 328 thereby synchronizing these parts. Shaft 83$^a$ drops slightly lower in speed as approximately half of clearance 335 and 338 are taken up during which time the blocker teeth 186 move off the ends of teeth 181 out of blocking relationship with respect to the teeth of sleeve F' and against the sides of teeth 181$^a$ into a position allowing rearward shift of this sleeve to clutch with teeth 110, 110$^a$. Full clutching will ordinarily take place as soon as the engine is accelerated as before.

It will be apparent that the overrunning clutch Q is a synchronizing device as it automatically engages to synchronize the speeds of the sleeve F' and gear 109$^a$, holding these parts synchronized while allowing the driving shaft to drop slightly in speed the amount of the approximately half of the spline clearance 335 to unblock the sleeve. The driving shaft is prevented from falling below the speed of the driven part 328 when the sleeve is fully forward (motor J vented) owing to the engagement of splines 332, 333 at which time nearly all of the clearance 338 is transferred to the trailing portions of rollers 329 such that extension 334 does not strike the rollers and release them.

The drive in second is similar to that of transmission D, the engine being available for braking the car on coast through the second speed train without free wheeling. Also as there is now no governor switch, acceleration is in second after coast down to any speed.

The shift from second to third is effected manually just as set forth for transmission D. Likewise, third will always be obtained regardless of whether the clutch pedal 84 is released before or after the accelerator pedal is depressed.

The shift from third to the direct fourth is automatic, the clutch Q and sleeve F' functioning just as recited for the shift from first to second.

The other functions of transmission D' are as set forth for transmission D with such variation as is occasioned by the absence of the governor switch. For example, the kickdown functions are now effective to release sleeve F' even at relatively low car speeds.

The reverse drive is substantially as aforesaid although now, when the reverse drive is taken through clutch G (clutch Q overrunning) there is no free-wheeling at any speed because on the coast clutch Q engages (clutch G overrunning) to prevent the driving shaft from dropping below the speed of the gear 109$^a$. The reverse is stepped-up as before, by the clutching of sleeve F'.

In order to start a dead engine by towing the car it is now only necesary to shift sleeve H to its high or low clutching position. The engine will be turned over because clutch Q will lock the gear 109$^a$ (now driving) with the shaft 83$^a$.

Referring now to Figs. 37 to 39 and the control system of Figs. 40 and 41, we have shown a further modified transmission which corresponds fundamentally with the foregoing embodiments but differs as follows. First, the Fig. 37 transmission incorporates a device for rendering the countershaft drive overrunning clutch inoperative or neutral in response to clutching shift of the automatic shift sleeve to avoid any undesired condition of no-back locking of the car. With this provision, it is not necessary or desirable to use the no-back mechanism R of Fig. 30 although it could be employed if desired.

Figure 40:
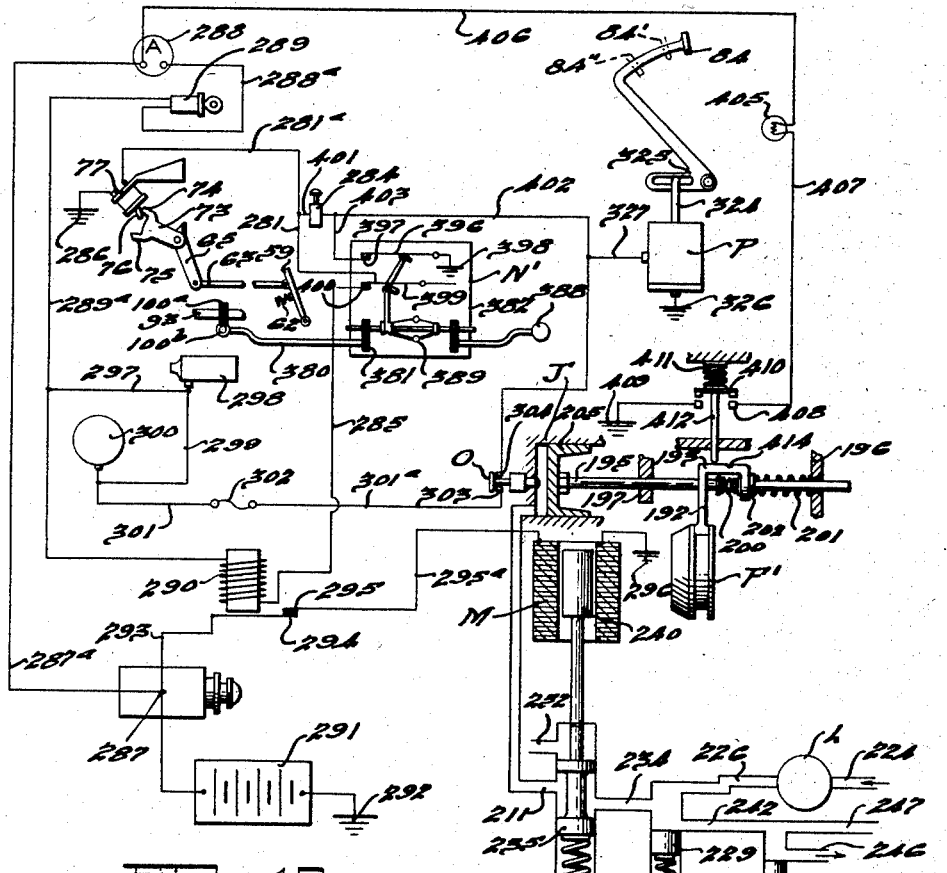
Fig. 40 is a wiring diagram for the Fig. 37 transmission.
Figure 41:
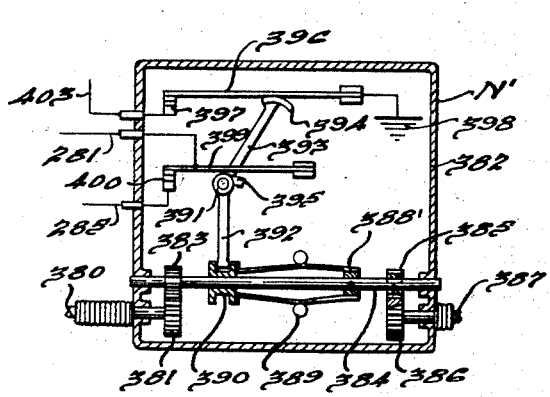
Fig. 41 is an enlarged diagrammatic view of the governor switch of Fig. 40.

Further, the Fig. 40 arrangement provides a governor switch not only to energize the solenoid at low speeds but also to break the kickdown circuit above a predetermined high speed of the car, say at 55 or 60 m.p.h. so that the kickdown control cannot be operated above this speed. This affords a protection against undue engine racing above the point where the kickdown would not be very effective anyway or whether the engine could not speed up sufficiently to pick up the reduction drive.

Still further, the Fig. 40 arrangement incorporates an indicator or signal in the form of a dash light which is illuminated whenever the automatic clutch sleeve is in its forward position of release so as to advise the driver of the kickdown and clutched conditions of the automatic sleeve. Alternatively, the light could be arranged to illuminate when the sleeve is clutched.

In Fig. 37 we have illustrated a transmission D'' which is fundamentally the same as transmission D' of Fig. 30 except as noted above. In Fig. 37 the countershaft drive gear 96' is now internally cammed at 102' to clutch the rollers 103' with the cylindrical clutching portion 101' of the extension 99 of countershaft cluster 97 as before. The cage 104' of clutch G' for rollers 103' now has cammed slots 370 and the cage is, as before, yieldingly urged by a spring 105' in a direction tending to clutch rollers 103', viz., clockwise as viewed in Fig. 39. In this figure the gear 96' drives backwards or counterclockwise from pinion 90 to clutch the rollers 103' and thereby drive the countershaft cluster 97 backwards as before.

The drive or clutched position of rollers 103' and cam 96' is indicated at 371. If the cage 104' and rollers 103' are shifted backwards relative to cams 96' to the neutral or disengaged position 372 then the clutch G' will be rendered inoperative. In Fig. 37 we have provided such an arrangement.

The gear 96' has its hub portion 373 formed with straight or axially extending slots 374 surrounding by an annular collar 375 which has an outwardly projecting annular shoulder 376 which has a portion thereof always engaged in the shift groove 191 of the sleeve F'. A pin 377 extends through each overlapped pair of slots 370, 374 and the pins are fixed in shoulder 376. The forward end of each cage slot 370 is circumferentially offset or enlarged at 378.

When sleeve F' is in its forward declutched position, as when motor J is vented, then collar 375 is forward as in Fig. 37 and pins 377 are each disposed at the forward ends of slots 370, 374. In such position the inner end of each pin 377 is disposed in an offset 378 so that the cage 104 can rotate slightly relative to gear 96' and an associated slot 374 in accommodating engagement and release of overrunning clutch G'. However, when sleeve F' is shifted rearwardly to its clutched position, this shifting movement shifts collar 375 rearwardly also and the pins 377 are moved axially rearwardly in slots 374. The inner ends of the pins move rearwardly in cage slots 370 and thus rotate the cage and rollers to the neutral position 372 relative to gear 96' thereby rendering clutch G' inoperative. When sleeve F' shifts forward, then the cage is restored to its normal functioning just as for clutch G in Fig. 30. Therefore, it is not possible to encounter any undesirable no-back condition of lock-up in the transmission with sleeves F' and H both clutched. The clutch G' might as well be employed in conjunction with the sleeve F in the Fig. 9 arrangement.

Instead of driving the governor switch from the countershaft gear 223 we now contemplate driving the governor switch, when employed, from the speedometer drive mechanism taken as before from gear 100ᵇ meshed with drive gear 100ᵃ on driven shaft 93. In Fig. 40 the gear 100ᵇ drives through flexible cable 380 and terminates in a drive gear 381 in housing 382 of the governor switch N' (Fig. 41). This gear 381 drives a gear 383 fixed to shaft 384 which in turn drives two gears 385, 386 to the continuing flexible cable 387 for driving the speedometer 388.

Fixed to shaft 384 is a collar 388' of governor 389 which operates the sliding collar 390 toward collar 388' as the weights fly out. Pivotally mounted to the casing at 391 is a lever having arms 392 and 393. Lever arm 392 has its free end in collar 390 while arm 393 has its upper end formed with a cam or finger 394. A second cam finger 395 is secured to the lever adjacent pivot 391.

When the governor 389 is not operating, finger 394 engages a spring switch contactor 396 which then engages the fixed switch piece 397. Contactor 396 is grounded at 398 and the arrangement is such that this contactor is sprung upwardly to open the switch 396, 397 at a low car speed so as to function just like the governor switch N except that in the present instant this switch will have a critical speed constant for a car speed regardless of the gear ratio through the transmission because now the governor is driven from the driven shaft 93. Let us assume, for example, that this critical speed is 7.5 m.p.h. car speed just as before, it being obvious that by properly proportioning the various operating parts the low speed switch may be made to open at any desired car speed.

The finger 395 is so proportioned that at a relatively high car speed, say 55 or 60 m.p.h., this finger will in similar manner raise the switch piece 399 away from fixed switch piece 400. As the car accelerates from rest, the switch 396, 397 therefore first opens at 7.5 m.p.h. car speed and stays open above this speed. When the car reaches 55 m.p.h. then the switch 399, 400 opens to break the kickdown circuit and thereby render the kickdown mechanism inoperative.

The Fig. 40 diagram is, in general, similar to the Fig. 29 diagram with provision for governor switch N'. Thus in Fig. 40, the wire 281ᵃ has the branches 281 and 401. The branch lead 281 goes to switch piece 399 while wire 401 goes to the dash switch 284, this wire then continuing through wire 402 to contact 304 of switch O. The wire 327 from clutch switch P now leads to the wire 402. Solenoid wire 285 leads to switch piece 400. The switch piece 397 is connected by a wire 403 to the wire 402.

The clutch pedal circuit for energizing solenoid M extends from ground 326 through switch P and wires 327, 402 through dash switch 284, wires 401 and 281 thence through the high speed switch 399, 400 and wire 285. From wire 285 the circuit extends to relay 290, thence as before through ignition switch 289, ammeter 288, starter terminal 287, battery 291 and ground 292. The main solenoid circuit which is thereby energized to operate solenoid M is just as for Fig. 29.

The kickdown relay circuit comprises ground 286, switch 77, leads 281ᵃ, 281, high speed switch 399, 400, wire 285 to relay 290 and thence as before through switch 289, ammeter 288, battery 291 and ground 292. At low speeds, the ground 398 completes the relay circuit through low speed switch 396, 397, leads 402, 402 through switch 284 and leads 401, 281 thence through high speed switch 399, 400 to relay 290 and around to ground 292. The main solenoid circuit comes into action by either switch 77 or switch 396, 397.

The kickdown ignition circuit is much as in Fig. 29 and comprises ground 286, switch 77 and leads 281ᵃ, 401, switch 284, lead 402 to switch O, thence just as in Fig. 29 to distributor 300, coil 298, switch 289, ammeter 288 to ground 292.

The operation of the Fig. 37 transmission is just as for Fig. 30 with the following exceptions or additions. At high car speeds, such as the assumed 55 m.p.h., switch 399, 400 opens to render the kickdown circuit inoperative even though switch 77 is closed.

Whenever sleeve F' is clutched, then overrunning clutch G' is rendered inoperative thereby avoiding the possibility of any locked-up condition in the transmission. Therefore where the control connection at pins 377 is employed between sleeve F' and clutch G' it is not really necessary to use the low speed governor switch 396, 397.

Where overrunning clutch Q is employed, as in Fig. 37, it is also not necessary to employ the dash switch 284 because this clutch will engage to enable starting the engine by towing the car. If the clutch Q is not used, as in Fig. 9, then the dash switch 284 has particular significance as aforesaid. When, as in Fig. 37, the switch 284 is employed in conjunction with switches 396, 397 and 399, 400 then opening switch 284 will prevent switches P and 397, 397 from energizing solenoid M.

There is a further feature illustrated in Fig. 40 whereby a dash light 405 is illuminated whenever the sleeve F' is in its kickdown or released position. This light is in a circuit from ground 292, battery 291, wire 287ᵃ, ammeter 288 thence through a lead 406 to the light bulb 405 from which a wire 407 extends to a light switch 408 and ground 409. The movable switch piece 410 is yieldingly urged downwardly to close the switch by a spring 411. The switch piece 410 has a plunger 412 guided in a casing portion 413, the lower end of the plunger being raised by sliding contact with bar 193 whenever sleeve F' is moved rearwardly from its forward released position. When the sleeve F' is fully forward then a notch 414 of bar 413 is aligned with plunger 412 which thereupon lowers by spring 411 to close switch 408 and illuminate the bulb 405.

The Fig. 40 arrangement of transmission control is especially advantageous in connection with our Fig. 9 embodiment and such a system has been found in actual practice to afford very desirable car driving characteristics. In connection with such a system, or the Fig. 40 system used for other embodiments of our invention, it is possible to locate the dash switch 284 at a point such that the transmission will operate through four speed ratios of up and down changes or to instantly convert the control system to function only for three speed ratios while the omitted speed ratio is employed only for the kickdown.

Figure 42:
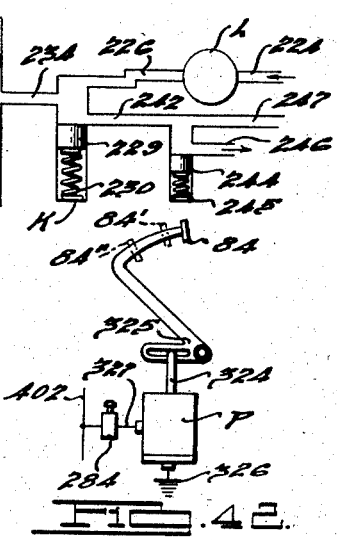
Fig. 42 is a diagrammatic view of a portion of the Fig. 40 diagram illustrating a further modified control arrangement.

Fig. 42 represents a control system just like Fig. 40 except that dash switch 284 is now located in wire 327 instead of in wire 401 which latter would not be uninterrupted. In Fig. 42 the dash switch 284 when left closed will cause the transmission (Figs. 9, 30 or 37) to operate throughout its four speed ratios just as set forth in the foregoing description. When the dash switch is opened to cut out the clutch switch P then the functions of the transmission are slightly altered as follows. First of all, the car towing to start the engine will be slightly altered in that the Fig. 42 dash switch now cuts out only the clutch switch P and not the governor switch 278, 279 (Fig. 29) or 396, 397 (Fig. 40) so that the car must be towed above the critical speed of the governor to open such governor switch in order that pressure fluid may be delivered to fluid motor J to effect the clutching of the automatic shift sleeve F or F'. This is not objectionable however, because of the low car speed at which the governor will function to bring about this condition. Secondly as the clutch pedal of Fig. 42 now no longer functions to energize the solenoid M it will be apparent that when the manually shiftable sleeve H is shifted rearwardly the car will start in low as before and then automatically into second on coast by engagement of the automatic shift sleeve F or F'. Now when the manual sleeve H is shifted forwardly the clutch pedal 84 being operated the solenoid is not now energized and the automatic sleeve will remain engaged thus providing a shift from second to direct without including third. Third speed comes into action however by the kickdown of the accelerator pedal 59 causing the automatic sleeve to release while the manual sleeve remains at its forward shift position. Third is also available as a starting ratio with automatic shift to direct. Of course, if desired the dash switch 284 and clutch switch P may be entirely omitted without providing for the conversion of the system to the normal four speed operation or the modified system aforesaid.

We do not limit our invention in the broader aspects thereof, to any particular combination and arrangement of parts such as shown and described for illustrative purposes since various modifications will be apparent from the teachings of our invention and scope thereof as defined in the appended claims.

We claim:

1. In a power transmission for driving a vehicle having an engine; change speed means selectively operable to effect change in the transmission speed ratio to provide relatively fast and slow vehicle drives; electromagnet-controlled pressure differential operating means for controlling said selective operation of said change speed means; valving means operably controlled by energization and deenergization of said electromagnet thereby to control differential pressure operation of said differential pressure operating means; speed controlled means comprising governor switch means operable responsive to speed of the vehicle for effecting energization and de-energization of said electromagnet; and means including an accelerator-pedal-operated switch operable by the vehicle driver for effecting energization and de-energization of said electromagnet; said speed controlled means operating to overrule said driver operable means when the vehicle is travelling above a predetermined speed.

2. In a power transmission for driving a vehicle having an engine; change speed means operable to effect change in the transmission speed ratio; an electrically energized device for controlling operation of said change speed means; governor means; means for operating said governor means at a speed proportionate to the vehicle speed; a low speed switch operably associated with said governor means so as to be opened thereby at a relatively low speed of operation of said governor means; a high speed switch operably associated with said governor means so as to be opened thereby at a relatively high speed of operation of said governor means; each of said switches being biased to its closed position when the vehicle is at rest; electrical circuit-forming means including said switches in series with each other for controlling energization of said device; and second electrical circuit-forming means including said high speed switch for controlling energization of said device when said low speed switch is open.

3. In a power transmission for driving a vehicle having an engine; change speed means operable to effect change in the transmission speed ratio; an electromagnetically controlled differential pressure operated motor for controlling operation of said change speed means; governor means; means for operating said governor means at a speed proportionate to the vehicle speed; a low speed switch operably associated with said governor means so as to be opened thereby at a relatively low speed of operation of said governor means; a high speed switch operably associated with said governor means so as to be opened thereby at a relatively high speed of operation of said governor means; each of said switches being biased to its closed position when the vehicle is at rest; a third switch operable by the driver; electrical circuit-forming means for controlling energization of said electromagnet by said low speed switch such that said electromagnet is maintained energized by the closed low speed switch below said relatively low speed of operation of said governor means and is de-energized by opening of the low speed switch; and electrical circuit-forming means for controlling energization of said electromagnet when said low speed switch is open, comprising, said third and high speed switches arranged in series with each other.

4. In a power transmission for driving a vehicle having an engine provided with an ignition system; change speed means including a transmission drive-control element operable to effect change in the transmission speed ratio; a reciprocatory differential pressure and spring operated power element operable in one direction for controlling upshift operation of said drive-control element and in the return direction for controlling downshift operation of said drive-control element; electromagnet operated means for controlling operation of said power element; speed controlled means for effecting energization and de-energization of said electromagnet; a control element operable by the vehicle driver; and means operable in response to operation of said control element, under control of said speed controlled means, for simultaneously effecting momentary interruption of the engine ignition system and controlling energization of said electromagnet thereby to effect down-shift change in the transmission speed ratio, said ignition interrupting means including an ignition grounding line having an ignition controlling switch interposed therein and having a switch controlling member adapted for engagement with said power element to control an operation of said switch in response to movement of said power element.

5. In a power transmission for driving a vehicle having an engine; change speed means operable to effect change in the transmission speed ratio; electromagnet operated means for controlling operation of said change speed means; governor means; means for operating said governor means at a speed proportionate to the vehicle speed; circuit-controlling means operated by said governor means; electrical circuit-forming means controlled by said circuit-controlling means for energizing said electromagnet; switch means; means operable by the vehicle driver for operating said switch means; electrical circuit-forming means controlled by said switch means for energizing said electromagnet; electrical circuit-forming means controlled by said switch means for causing interruption of the normal power delivery of the engine; and means operated by said governor means for disabling the second said electrical circuit-forming means when the vehicle is travelling above a predetermined speed.

6. In a power transmission for driving a vehicle having an engine; change speed means operable to effect change in the transmission speed ratio; an electrically energized device for controlling operation of said change speed means; governor means; means for operating said governor means at a speed proportionate to the vehicle speed; a low speed switch operably associated with said governor means so as to be opened thereby at a relatively low speed of operation of said governor means; a high speed switch operably associated with said governor means so as to be opened thereby at a relatively high speed of operation of said governor means; each of said switches being biased to its closed position when the vehicle is at rest; a third switch operable by the driver; electrical circuit-forming means for controlling energization of said device by said low speed switch such that said device is maintained energized by the low speed switch below said relatively low speed of operation of said governor means and is de-energized by opening of the low speed switch; electrical circuit-forming means for controlling energization of said device when said low speed switch is open, comprising, said third and high speed switches arranged in series with each other; and means controllable by said third switch for interrupting the normal power delivery of the engine.

7. In a power transmission for driving a vehicle; change speed means selectively operable to effect change in the transmission speed ratio to provide relatively fast and slow vehicle drives; pressure differential operated motor means operable to control said change speed means for step-down and step-up change selectively between said drives; valve means operable to control operation of said motor means; an electromagnet adapted to be energized and de-energized to control operation of said valve means; a step-down switch; a transmission control element adapted for actuation by the vehicle driver; means operable by actuation of said transmission control element to a predetermined position for effecting operation of said step-down switch; electrical circuit means, under control of said step-down switch for controlling energization of said electromagnet such that, when the vehicle is being driven in said relatively fast drive, operation of said step-down switch as aforesaid causes said step-down control of said motor means; a step-up switch; a step-down limit switch; means for effecting operation of said step-up switch and said step-down limit switch in response, respectively, to predetermined relatively low and high vehicle speeds; and electrical circuit means, under control of said step-up switch and said step-down limit switch, for controlling energization of said electromagnet such that, when the vehicle is accelerated in said relatively slow drive to said relatively low vehicle speed, operation of said step-up switch causes step-up control of said motor means, and such that, when the vehicle is accelerated in said relatively fast drive to said relatively high vehicle speed, operation of said step-down limit switch disables the first said electrical circuit means so as to present said step-down control of said motor means under control of said step-down switch.

8. In a power transmission for driving a vehicle having an engine provided with an ignition system; change speed means including a transmission drive control element operable to effect change in the transmission speed ratio; a reciprocatory differential pressure and spring operated power element operable in one direction for controlling upshift operation of said drive-control element and in the return direction for controlling downshift operation of said drive-control element; solenoid operated means for controlling operation of said power element; speed controlled means for effecting energization and de-energization of said solenoid; an accelerator pedal operable by the vehicle driver for controlling the engine; and means operable in response to operation of said accelerator pedal under control of said speed controlled means, for simultaneously effecting momentary interruption of the engine ignition system and controlling energization of said solenoid thereby to effect downshift change in the transmission speed ratio; and speed controlled means for preventing said energization control of said solenoid by said operation of said accelerator pedal thereby overruling said downshift means.

9. In a motor vehicle having an engine and a power transmission, a throttle valve for controlling the engine, an accelerator pedal for controlling said throttle valve, means adapted to provide a speed ratio change in said transmission, means including electromagnetic and differential fluid pressure means for effecting operation of said change speed means to establish a speed ratio drive change, means responsive to a predetermined vehicle speed for conditioning said electromagnetic means for effecting operation of said change speed means to establish a step-up in speed ratio drive in said transmission, means responsive to movement of the accelerator pedal to a predetermined position in throttle opening direction for conditioning said electromagnetic means to effect a step-down in the speed ratio drive of the transmission thereby to obtain quick acceleration of the vehicle by said transmission, and means responsive to a predetermined higher vehicle speed when the vehicle is being driven in said stepped-up speed ratio drive, for maintaining said electromagnetic means in said stepped-up speed ratio establishing condition regardless of operation of the accelerator pedal as aforesaid.

10. A variable speed transmission having a shiftable element for changing the ratio therethrough from a low ratio to direct drive, electromagnetic means for controlling the element, governor means operated in unison with the transmission for controlling the electromagnetic means to effect a shift from low to direct drive, said governor means having at least two circuits therethrough, one of said circuits controlling the shift into direct drive, and the other controlling the shift out of direct drive into low, said other circuit including a manually operated switch and a governor operated switch in series, such that within a predetermined range of speeds the manually operated switch is effective to shift out of direct into low, and above said predetermined range of speeds the governor operated switch prevents a shift into low, the said one of said circuits being independent of said manually controlled switch and controlling the electromagnetic means in direct response to speed changes in the governor means.

11. A variable speed transmission having a shiftable element for changing the ratio therethrough, electromagnetic means for controlling the element, governor means operated in unison with the transmission for controlling the electromagnetic means, said governor means having two circuits therethrough, one of said circuits controlling the electromagnetic means directly and the other circuit including a manually controlled switch whereby to render the second circuit manually controlled, said manually controlled circuit being effective over a greater range of speeds than the said one of said circuits, said governor rendering the manually controlled circuit ineffective above a predetermined operating speed of said transmission.

12. A variable speed transmission having a shiftable element for changing the ratio therethrough, electromagnetic means for controlling the element, governor means operated in unison with the transmission for controlling the electromagnetic means, said governor means having at least two circuits therethrough, one of said circuits controlling the electromagnetic means in direct response to speed changes in the governor, and the other circuit including a manually controlled switch, whereby to render the second circuit manually controlled, the said one of said circuits being independent of said switch, said manually controlled circuit being effective over a greater range of speed ratios than the said one of said circuits.

13. A variable speed transmission having a shiftable element for changing the ratio therethrough, electromagnetic means for controlling the element, governor means operated in unison with the transmission for controlling the electromagnetic means, said governor means having at least two circuits therethrough, one of said circuits controlling the electromagnetic means in direct response to speed changes in the governor, and the other circuit including a manually controlled switch, whereby to render the second circuit manually controlled, the said one of said circuits being independent of said switch, said manually controlled circuit being effective over a greater range of speeds than the said one of said circuits.

14. A variable speed transmission as described in claim 12, a throttle operator, and means for operating the manually controlled switch from the throttle operator.

15. A variable speed transmission having a shiftable element for changing the ratio therethrough, electromagnetic means for controlling the element, governor means operated in unison with the transmission for controlling the electromagnetic means, said governor means having at least two circuits therethrough, one of said circuits controlling the electromagnetic means in direct response to speed changes in the governor, and the other circuit including a manually controlled switch, whereby to render the second circuit manually controlled, the said one of said circuits being independent of said switch, said manually controlled circuit being effective over a greater range of speeds than the said one of said circuits, a throttle operator, and means for operating the manually controlled switch from the throttle operator.

16. In a power transmission for driving a vehicle having a prime mover; a prime mover controlling element adapted for operation by the vehicle driver; change speed means operable to effect change in the transmission speed ratio to provide relatively fast and slow vehicle drives; a solenoid-controlled pressure fluid and spring operated motor for controlling said selective operation of said change speed means; a source of fluid; means for pumping fluid under pressure from said source to said motor for effecting a pressure fluid operation of said motor; valving means operably controlled by energization and de-energization of said solenoid for so controlling admission of said pumped fluid to and venting of said motor as to thereby control pressure fluid and spring operations of said motor; means operable in response to predetermined operation of said prime mover controlling element for so controlling energization of said solenoid as to effect selective control of said vehicle drives; vehicle speed responsive means operable to effect selective control of said vehicle drives; and means effective when the vehicle is travelling above a predetermined speed for overruling said selective control by operation of said prime mover controlling element such that said predetermined operation of this element will not exercise the aforesaid control on energization of said solenoid.

17. In a power transmission for driving a vehicle of the type having a driver-operable engine-controlling accelerator pedal; a torque-transmitting member adapted to be driven by said engine and a second torque-transmitting member adapted to be driven from the first said torque-transmitting member for driving the vehicle; change speed means in the drive between said torque-transmitting members operable under control of said pedal to effect change between two drives of relatively different speed ratio, said change speed means comprising a drive-control element shiftable between a first position of accommodating the slower of said drives and a second position of effecting drive-connection of said torque-transmitting members for providing the faster of said drives; a spring biasing said element to its said first position; a differential pressure fluid operated motor adapted, when subjected to differential pressure, to control shift of said element to its said second position by opposing the biasing action of said spring on said element and, when vented, to allow said spring to bias said element to its said first position; solenoid-controlled valving means for controlling differential pressure operation and venting of said motor; vehicle speed controlled means for effecting energization and de-energization of said solenoid; electrical control means including a kickdown switch operable by the vehicle driver in response to predetermined operation of said pedal for effecting energization and de-energization of said solenoid; and overruling control means automatically effective upon the vehicle attaining a predetermined speed for exercising overruling control on said electrical control means such that said predetermined operation of said pedal will not effect energization and de-energization of said solenoid.

18. In a power transmission for driving a vehicle of the type having a driver-operable engine-controlling accelerator pedal; a torque-transmitting member adapted to be driven by said engine and a second torque-transmitting member adapted to be driven from the first said torque-transmitting member for driving the vehicle; change speed means in the drive between said torque-transmitting members operable under control of said pedal to effect change between two drives of relatively different speed ratio, said change speed means comprising a drive-control element shiftable between a first position of accommodating the slower of said drives and a second position of effecting drive-connection of said torque-transmitting members for providing the faster of said drives; a spring biasing said element to its said first position; a differential pressure fluid operated motor adapted, when subjected to differential pressure, to control shift of said element to its said second position by opposing the biasing action of said spring on said element and, when vented, to allow said spring to bias said element to its said first position; solenoid-controlled valving means for controlling differential pressure operation and venting of said motor; vehicle speed controlled means for effecting control of energization of said solenoid at predetermined vehicle speeds thereby to control said change speed means for upshift and downshift changes between said speed ratio drives; electrical control means including a kickdown switch operable under control of the vehicle driver in response to operation of said pedal to a predetermined position in the engine throttle opening direction of pedal movement for effecting downshift control on the energization of said solenoid; means biasing said pedal for movement thereof in the opposite direction to a predetermined position of closed engine throttle; blocking means so operably associated with said shiftable drive-control element as to prevent said drive-connection of said drive-control element from taking place when said pedal is operated in throttle-opening direction to less than its said predetermined position in accelerating the vehicle by operation of said relatively slow drive to and above a speed at which said vehicle speed controlled means effects upshift control on the energization of said solenoid, said blocking means being adapted thereafter to unblock said shiftable drive-control element to accommodate said drive-connection in response to driver release of said pedal attended by operation of said pedal biasing means as aforesaid whereby upshift in the change speed means by establishment of said drive-connection may be delayed as desired at the will of the driver and the vehicle thereby accelerated and driven by operation of said relatively slow drive.

19. In a power transmission according to claim 18; and means effective when the vehicle is being driven by operation of said relatively fast drive above a predetermined speed faster than the aforesaid speeds for overruling said downshift control by operation of said pedal as aforesaid such that said predetermined positioning of said pedal in throttle opening direction will not exercise the aforesaid control on the energization of said solenoid.

20. In a power transmission for driving a vehicle of the type having a driver-controlled engine-controlling accelerator pedal; a torque-transmitting member adapted to be driven by said engine and a second torque-transmitting member adapted to be driven from the first said torque-transmitting member for driving the vehicle; change speed means in the drive between said torque-transmitting members operable under control of said pedal to effect changes between two drives of relatively different speed ratio, said change speed means comprising a drive-control clutch element of the toothed positively clutching type shiftable between a first position of accommodating the slower of said drives for multiplying torque between said torque-transmitting members and a second position of effecting the faster of said drives by clutching with a toothed companion clutch member and thus providing clutched direct drive-connection of said torque-transmitting members; a motor comprising a power element adapted for differential pressure fluid actuation to control shift of said drive-control element to its said second position; spring means biasing said drive-control element for shift to its said first position; motor controlling means operable to control said motor thereby to control shift of said drive-control element between its said first and second positions; vehicle speed responsive means for controlling said motor-controlling means to direct shift of said drive-control element to its said first position on bringing the vehicle to rest and to its said second position when the vehicle, on acceleration from rest, reaches a predetermned speed; and blocking means so operably associated with said shiftable drive-control element as to limit shift of this element toward its said second position sufficiently to maintain the clutching teeth of this element free from engagement with the teeth of said companion clutch member and to prevent said direct drive-connection from taking place so long as the acelerator pedal is positioned for effecting acceleration of the vehicle in said relatively slow drive above said predetermined speed and to unblock said drive-control element for shift thereof to its said second position as a function of release of the accelerator pedal.

21. In a power transmission according to claim 20; transmission kickdown means for overruling said vehicle responsive means for effecting shift of said shiftable drive-control element from its said second position to its said first position when, with the vehicle being driven by the engine above said predetermined speed, the accelerator pedal is operated to the limit of its movement in throttle opening direction.

22. In a power transmission according to claim 20; transmission kickdown means for overruling said vehicle responsive means for effecting shift of said shiftable drive-control element from its said second position to its said first position when, with the vehicle being driven by the engine above said predetermined speed, the accelerator pedal is operated to the limit of its movement in throttle opening direction; and means for overruling said transmission kickdown means in response to predetermined vehicle speed in excess of that aforesaid.

23. In a power transmission for driving a vehicle of the type having a driver-operable engine-controlling accelerator pedal; a torque-transmitting member adapted to be driven by said engine and a second torque-transmitting member adapted to be driven from the first said torque-transmitting member for driving the vehicle; change speed means in the drive between said torque-transmitting members operable under control of said pedal to effect change between two drives of relatively different speed ratio, said change speed means comprising a drive-control clutch element of the toothed positively clutching type shiftable between a first position of accommodating the slower of said drives and a second position of effecting drive-connection of said torque-transmitting members for providing the faster of said drives; a spring biasing said element to its said first position; a differential pressure fluid operated motor adapted, when subjected to differential pressure, to control shift of said element to its said second position by opposing the biasing action of said spring on said element and, when vented, to allow said spring to bias said element to its said first position; electromagnet-operated valving means for controlling differential pressure operation and venting of said motor; speed responsive control means operating proportionate to vehicle speed for so controlling energization of said electromagnet as to operate said valving means for differential pressure operation of said motor when the vehicle reaches a predetermined speed and venting of said motor when the vehicle is brought to a temporary stop; means operable under control of said speed controlled means to prevent said drive-connection of said drive-control element when said pedal is positioned for causing imposition of vehicle driving load on said engine but allowing said drive-connection to take place when said pedal is positioned to relieve said engine from said load; means operable at the will of the driver for overruling said speed responsive control means thereby to effect venting of said motor when the vehicle is travelling above the aforesaid predetermined speed; a vehicle speed responsive limit switch; and electrical circuit means including said electromagnet and said limit switch operating to prevent venting of said motor by said overruling means when the vehicle is travelling above a second predetermined speed.

24. In a power transmission for driving a vehicle having an engine; a rotatable driving structure adapted to receive drive from the engine; a rotatable driven structure adapted to transmit drive from the driving structure for driving the vehicle; a drive-controlling clutch member drivingly connected with one of said structures and shiftable to positively clutch with the other of said structures to establish a driving relationship between said structures; a fluid operated motor for controlling shift of said clutch member; valving means for controlling application of fluid under pressure to said motor; an electromagnet operably associated with said valving means and adapted when energized to cause the valving means to vent said motor; means urging release of said clutching member from its clutching position when said motor is vented; electrical circuit-forming means adapted when established to energize said electromagnet; a relay adapted when energized to establish said electromagnet-energizing circuit-forming means; electrical circuit-forming means adapted when established to energize said relay; a pair of series arranged switches, one normally open and the other normally closed, for establishing said relay-energizing circuit-forming means when the normally open switch is closed; means operable by the vehicle driver for closing said normally open switch; and means operating in response to rotation of one of said structures above a predetermined speed for opening said normally closed switch.

25. In a power transmission for driving a vehicle having an engine; a rotatable driving structure adapted to be driven by the engine; a rotatable driven structure adapted to transmit drive from the driving structure for driving the vehicle; transmission means including drive control elements one being shiftable to positively engage with the other thereby to establish a driving relationship between said structures; a differential pressure operated motor for controlling shift of said shiftable element; valving means operable to control application of differential pressure to, and venting of, said motor; means comprising an electromagnet operably associated with said valving means for effecting said operation of said valving means; means urging disengagement of said shiftable element from the other of said drive control elements when said motor is vented; a relay switch operable to open and closed positions; electrical circuit-forming means including said relay switch adapted, upon closing of said relay switch, to electrically energize said electromagnet; means comprising a relay solenoid adapted to be electrically energized and de-energized thereby to effect operation of said relay switch; electrical circuit-forming means adapted when established to electrically energize said relay solenoid; a pair of switches arranged in series with each other, one normally open and the other normally closed, for establishing said solenoid-energizing circuit-forming means when the normally open switch is closed; means operable by the vehicle driver for closing said normally open switch; and means operating in response to rotation of one of said structures above a predetermined speed for opening said normally closed switch.

References Cited in the file of this patent

UNITED STATES PATENTS

| | | |
|---|---|---|
| Re. 21,844 | Vetter | June 24, 1941 |
| 907,711 | Anthony | Dec. 29, 1908 |
| 1,185,528 | Oddie | May 30, 1916 |
| 1,839,145 | Forichon | Dec. 29, 1931 |
| 1,911,599 | Bloxsom | May 30, 1933 |
| 1,980,798 | Hale | Nov. 13, 1934 |
| 1,997,448 | Birkemeier | Apr. 9, 1935 |
| 2,008,231 | Vincent | July 16, 1935 |
| 2,051,553 | Fleischel | Aug. 18, 1936 |
| 2,062,104 | Prince | Nov. 24, 1936 |
| 2,169,216 | Bloxsom | Aug. 15, 1939 |
| 2,177,428 | Fleischel | Oct. 24, 1939 |
| 2,185,730 | Griswold | Jan. 2, 1940 |
| 2,225,493 | Barnes | Dec. 17, 1940 |
| 2,236,746 | Bush | Apr. 1, 1941 |
| 2,250,656 | Schjolin | July 29, 1941 |
| 2,251,213 | Lanphere | July 29, 1941 |
| 2,292,253 | Thurber | Aug. 4, 1942 |
| 2,322,479 | Schjolin | June 22, 1943 |

FOREIGN PATENTS

| | | |
|---|---|---|
| 457,269 | Great Britain | Nov. 24, 1936 |